(12) United States Patent
Richards

(10) Patent No.: US 9,915,104 B2
(45) Date of Patent: *Mar. 13, 2018

(54) DOWNHOLE EXPANDABLE CONTROL LINE CONNECTOR

(71) Applicant: Halliburton Energy Services, Inc., Houston, TX (US)

(72) Inventor: William Mark Richards, Flower Mound, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 274 days.

This patent is subject to a terminal disclaimer.

(21) Appl. No.: 14/439,097

(22) PCT Filed: Jun. 30, 2014

(86) PCT No.: PCT/US2014/044800
§ 371 (c)(1),
(2) Date: Apr. 28, 2015

(87) PCT Pub. No.: WO2016/003394
PCT Pub. Date: Jan. 7, 2016

(65) Prior Publication Data
US 2017/0138131 A1 May 18, 2017

(51) Int. Cl.
*G02B 6/46* (2006.01)
*E21B 17/02* (2006.01)
(Continued)

(52) U.S. Cl.
CPC ............ *E21B 17/02* (2013.01); *E21B 17/003* (2013.01); *E21B 47/12* (2013.01); *G02B 6/3807* (2013.01);
(Continued)

(58) Field of Classification Search
USPC .......................................... 385/76, 100, 135
See application file for complete search history.

(56) References Cited

U.S. PATENT DOCUMENTS 4,176,894 A 12/1979 Godbey
5,757,996 A 5/1998 Vine
(Continued)

FOREIGN PATENT DOCUMENTS

WO 2016003388 A1 1/2016
WO 2016003390 A1 1/2016
(Continued)

OTHER PUBLICATIONS

International Search Report and Written Opinion for PCT/US2014/044783 dated Mar. 27, 2015.
(Continued)

*Primary Examiner* — Eric Wong
(74) *Attorney, Agent, or Firm* — McDermott Will & Emery LLP

(57) ABSTRACT

An example control line connector includes an expandable housing having a helical body that defines one or more windings and a helical shroud disposed about the one or more windings, wherein a helical conduit chamber is defined between the helical body and the helical shroud, a matable connector at least partially disposed within the expandable housing and providing a mating face that faces tangentially with respect to the expandable housing so as to angularly mate with an opposing matable connector, and a splitter block coupled to the expandable housing and conveying one or more communication media into the helical conduit chamber to communicate with the matable connector.

28 Claims, 8 Drawing Sheets

(51) Int. Cl.
  *E21B 17/00* (2006.01)
  *E21B 47/12* (2012.01)
  *G02B 6/38* (2006.01)
  *G02B 6/44* (2006.01)
  *H01R 13/72* (2006.01)

(52) U.S. Cl.
  CPC ......... *G02B 6/3897* (2013.01); *G02B 6/4427* (2013.01); *G02B 6/4458* (2013.01); *H01R 13/72* (2013.01)

(56) References Cited

U.S. PATENT DOCUMENTS

| | | |
|---|---|---|
| 6,571,046 B1 | 5/2003 | Hickey et al. |
| 6,755,253 B2 | 6/2004 | Smith et al. |
| 7,100,690 B2 | 9/2006 | Mullen et al. |
| 7,222,676 B2 | 5/2007 | Patel et al. |
| 7,398,822 B2 | 7/2008 | Meijer et al. |
| 7,487,830 B2 | 2/2009 | Wolters et al. |
| 7,556,093 B2 | 7/2009 | Grigsby et al. |
| 7,594,763 B2 | 9/2009 | Richards et al. |
| 7,594,796 B2 | 9/2009 | De La Grandmaison et al. |
| 7,900,698 B2 | 3/2011 | Stoesz |
| 8,079,419 B2 | 12/2011 | Richards |
| 8,122,967 B2 | 2/2012 | Richards |
| 8,371,396 B2 | 2/2013 | Braden et al. |
| 8,794,337 B2 | 8/2014 | Thomas et al. |
| 9,404,314 B2 | 8/2016 | Perez et al. |
| 9,523,243 B2 | 12/2016 | Richards |
| 2002/0135179 A1 | 9/2002 | Boyle et al. |
| 2002/0162666 A1 | 11/2002 | Koehler et al. |
| 2003/0019638 A1 | 1/2003 | Simpson |
| 2003/0173077 A1 | 9/2003 | Smith et al. |
| 2003/0221829 A1 | 12/2003 | Patel et al. |
| 2004/0159444 A1 | 8/2004 | Wolters et al. |
| 2004/0173352 A1 | 9/2004 | Mullen et al. |
| 2004/0216872 A1 | 11/2004 | Foster et al. |
| 2005/0232548 A1 | 10/2005 | Ringgenberg |
| 2006/0108803 A1 | 5/2006 | Reynolds |
| 2006/0260817 A1 | 11/2006 | Meijer et al. |
| 2007/0159351 A1 | 7/2007 | Madhavan et al. |
| 2008/0029274 A1 | 2/2008 | Rytlewski et al. |
| 2008/0311776 A1 | 12/2008 | Cox et al. |
| 2009/0045146 A1 | 2/2009 | Stoesz |
| 2009/0050327 A1 | 2/2009 | Anderson et al. |
| 2009/0078430 A1* | 3/2009 | Du ................ E21B 17/1035 166/380 |
| 2010/0264640 A1 | 10/2010 | Lane et al. |
| 2010/0264646 A1 | 10/2010 | Follini |
| 2010/0264650 A1* | 10/2010 | Braden ................ E21B 17/028 285/333 |
| 2011/0108288 A1 | 5/2011 | Richards |
| 2012/0181045 A1 | 7/2012 | Thomas et al. |
| 2013/0048307 A1 | 2/2013 | Patel |
| 2013/0327546 A1 | 12/2013 | Rytlewski |
| 2014/0110122 A1 | 4/2014 | Henschel et al. |
| 2014/0339411 A1 | 11/2014 | Lagace et al. |
| 2015/0070185 A1 | 3/2015 | Schulz et al. |
| 2015/0204145 A1* | 7/2015 | Richards ............ E21B 17/026 166/380 |
| 2015/0368983 A1 | 12/2015 | Perez |
| 2015/0376956 A1 | 12/2015 | Richards |
| 2016/0168923 A1 | 6/2016 | Richards |
| 2016/0273279 A1 | 9/2016 | Richards |
| 2016/0290062 A1 | 10/2016 | Richards |
| 2016/0290063 A1 | 10/2016 | Richards |
| 2016/0356095 A1 | 12/2016 | Perez |

FOREIGN PATENT DOCUMENTS

| | | |
|---|---|---|
| WO | 2016003392 A1 | 1/2016 |
| WO | 2016003393 A1 | 1/2016 |
| WO | 2016003394 A1 | 1/2016 |
| WO | 2016003397 A1 | 1/2016 |

OTHER PUBLICATIONS

International Search Report and Written Opinion for PCT/US2014/044800 dated Mar. 31, 2015.

* cited by examiner

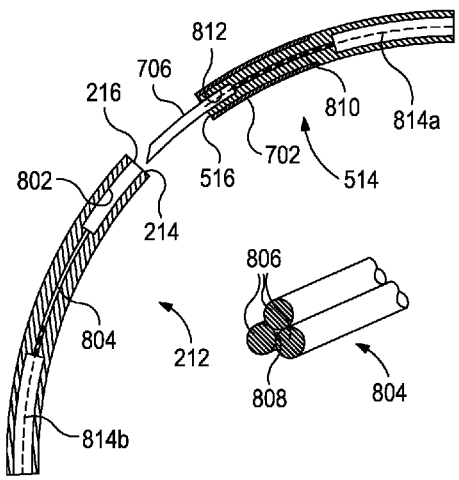
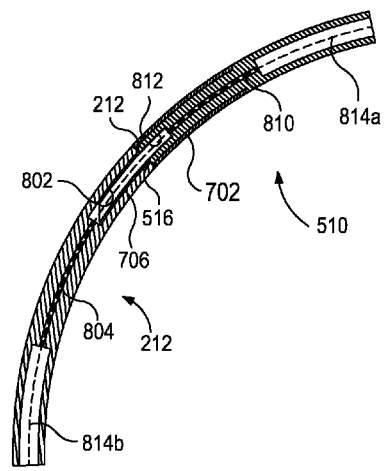
FIG. 8A          FIG. 8B
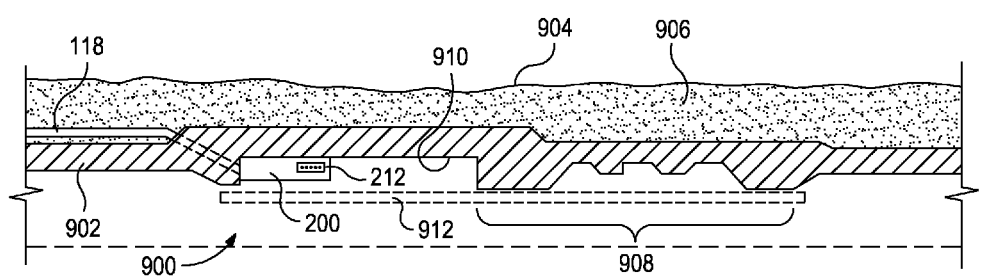
FIG. 9

DOWNHOLE EXPANDABLE CONTROL LINE CONNECTOR

This application is a National Stage entry of and claims priority to International Application No. PCT/US2014/044800, filed on Jun. 30, 2014.

BACKGROUND

The present disclosure relates generally to equipment utilized and operations performed in conjunction with subterranean wells and, more particularly, to a control line connector assembly for downhole use.

In the oil and gas industry, control lines are often run into a wellbore in order to communicate between a surface location and a downhole location. The control lines, which may include optical fibers, electrical conductors, or hydraulic conduits, enable the transmission of signals, downhole data acquisition, activation and control of downhole devices, and numerous other applications. For example, command and control signals may be sent from a surface location downhole through a control line and to a downhole tool located within the wellbore. In other applications, downhole sensors collect data and relay that data to the surface location through a control line uplink for evaluation or use in the specific well-related operation. In yet other applications, hydraulic pressure is conveyed through the control lines to act on or otherwise actuate one or more downhole tools or devices.

Fiber optic control lines, in particular, can provide valuable downhole sensing means in a wellbore environment. For instance, optical fibers are often used to obtain distributed temperature measurements along all or a portion of the wellbore. When used as a temperature sensor, optical fibers provide a more complete temperature profile as compared to discrete temperature sensors.

Use of an optical fiber for distributed downhole temperature sensing may be highly beneficial during wellbore completion and stimulation operations. In a stimulation operation, for instance, a temperature profile may be obtained to determine where injected fluid has entered surrounding formations or zones intersected by the wellbore. This information is useful in evaluating the effectiveness of the stimulation treatment and in planning future stimulation operations. Likewise, use of an optical fiber may also be highly beneficial during production operations. For example, a distributed temperature profile may be used in determining the location of water or gas influx along the sand control screens during production.

In order to facilitate the acquisition of downhole fiber optic measurements, it is sometimes necessary to establish a control line connection in the downhole environment. This can be done using either a dry or wet mate fiber optic connector, although wet mate connectors are more prevalent in downhole environments. It has been found, however, that wet mating optical fibers in a downhole environment can be quite difficult. Currently, most wet mate connectors use a telescoping metal housing (including male and female portions) that locates, aligns, and washes the face of the connection. In operation, the male and female wet mate housings are first aligned, and then the respective wet mate faces are brought together axially. The male and female wet mate housings are then axially compressed such that an inner housing moves inside an outer housing and the optical fibers align internally within the housings. The telescoping inner and outer housings bring the end faces of each fiber in contact.

While generally able to establish optical communication between upper and lower ends of an optical fiber, conventional fiber optic connectors suffer from at least two inherent flaws. First, the mating faces of conventional fiber optic connectors are axially disposed and thereby increasingly prone to soiling by grease, scale, and other debris commonly encountered in the downhole environment. Second, a short length of fiber inside the fiber optic connector is subjected to column loading and is, therefore, prone to buckling or breaking.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 8A and 8B illustrate cross-sectional side views of the box and pin connectors of FIGS. 5 and 6, according to one or more embodiments.

FIG. 9 illustrates a cross-sectional side view of an exemplary casing nipple, according to one or more embodiments

DETAILED DESCRIPTION

The present disclosure relates generally to equipment utilized and operations performed in conjunction with subterranean wells and, more particularly, to a control line connector assembly for downhole use.

The disclosed embodiments of the control line connector assembly may be useful in establishing a connection between two ends of a control line configured to convey various forms of communication media into a downhole environment. In some cases, for instance, the control line connector assembly may be configured to establish a connection between the ends of one or more optical fibers. As opposed to conventional control line connection systems that establish connection through relative axial movement of connection housings, the currently disclosed connection assembly is configured to mate opposing ends of the optical fibers in a tangential or curvilinear direction and otherwise through rotation of the opposing connection housings.

An upper connector may be arranged at a casing nipple on casing that lines a wellbore. An upper control line runs along the exterior of the casing to the upper connector. A lower connector may be expandable and able to axially and angularly mate with the upper connector by rotating the lower connector. The disclosed embodiments may prove useful in providing continuous monitoring of the cement surrounding the casing and along the exterior of any wellbore tubing or tools extending downhole from the control line connector assembly. In some embodiments, a real time position monitoring system may be used to aid in the mating of the upper and lower connectors.

Figure 1:
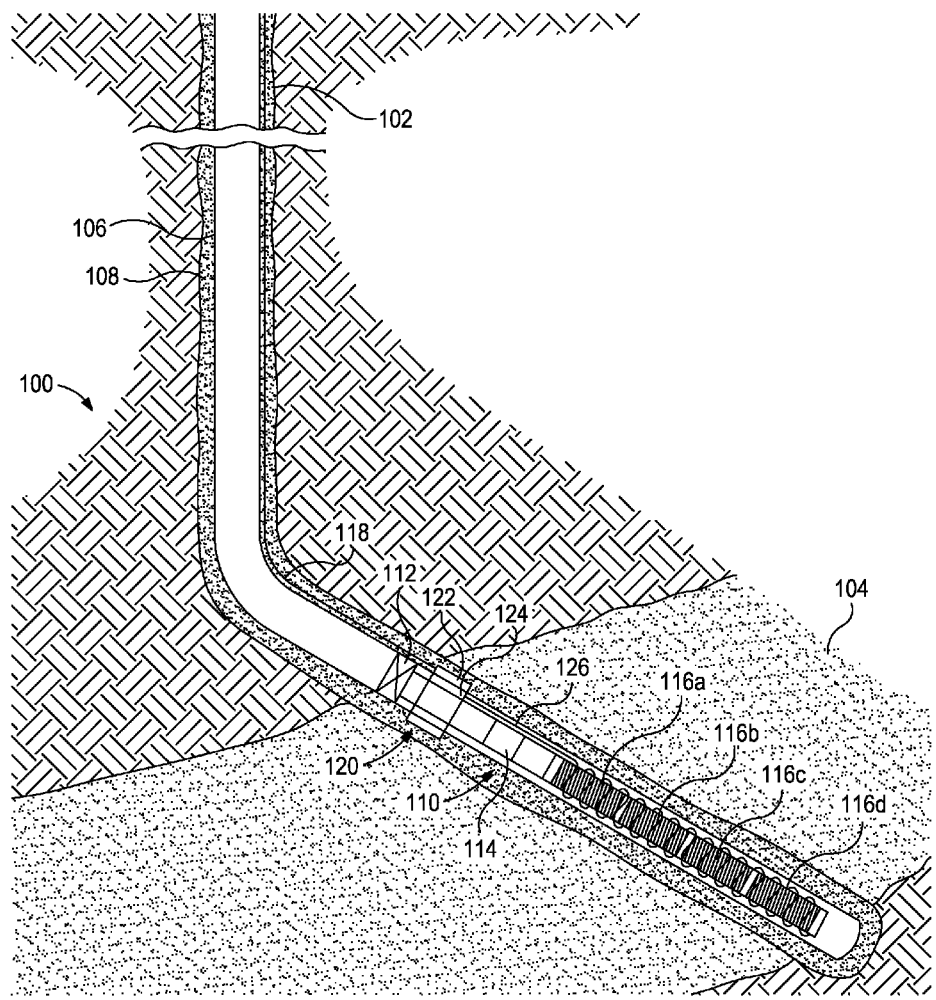
FIG. 1 illustrates a wellbore system that may employ the principles of the present disclosure, according to one or more embodiments.

Referring to FIG. 1, illustrated is a wellbore system 100 that may employ the principles of the present disclosure, according to one or more embodiments. As illustrated, a wellbore 102 extends through various earth strata, including a subterranean formation 104. In some embodiments, the wellbore 102 may extend from a land-based drilling rig or platform (not shown). In other embodiments, however, the wellbore 102 may be part of a subsea application and, therefore, extend from either a subsea platform or rig or otherwise from a wellhead installation (not shown) arranged on the sea floor. The wellbore 102 may include casing 106 that is secured within the wellbore 102 with cement 108. As depicted, the casing 106 and the cement 108 may extend to the bottom or "toe" of the wellbore 102. In other embodiments, however, the casing 106 and the cement 108 may terminate at an intermediate location prior to the toe of the wellbore 102, without departing from the scope of the disclosure. As used herein, the term "casing" generally refers to a string of pipe or tubulars lowered into an open hole wellbore 102 and cemented in place, and also refers to liner, which constitutes a string of pipe or tubulars that does not extend to the top of the wellbore 102 but instead is anchored or suspended from inside a previous casing string.

In some embodiments, a wellbore tubing 110 may be extended into the wellbore 102 and attached to the casing 106 at various locations. In some embodiments, for instance, the wellbore tubing 110 may be disposed at or near the bottom of the wellbore 102. In other embodiments, the wellbore tubing 110 may be coupled to the casing 106 at any intermediate point between the toe of the wellbore 102 and the surface. As used herein, the term "wellbore tubing" refers to any type of wellbore pipe or tubular wellbore equipment known to those skilled in the art and that may be extended and secured within the wellbore 102. In some embodiments, for instance, the wellbore tubing 110 may be additional length of casing 106, liner, or a liner string configured to be anchored to and otherwise "hung off" the casing 106 or the wellbore 102 at a predetermined location. In other embodiments, the wellbore tubing 110 may be production tubing or drill pipe disposed within the wellbore 102. In yet other embodiments, as illustrated, the wellbore tubing 110 may refer to a completion assembly, such as a gravel pack completion assembly. The depicted gravel pack completion assembly may include various tools such as a wellbore isolation device 112, a circulating valve assembly 114, and one or more sand control screen assemblies, shown as screen assemblies 116a, 116b, 116c, and 116d.

An upper control line 118 may extend along the exterior of the casing 106 and may otherwise be arranged or secured within the cement 108. In some embodiments, the upper control line 118 may extend from a surface location (not shown), but may equally extend from an intermediate location within the wellbore 102 between the surface and the wellbore tubing 110, without departing from the scope of the disclosure. The upper control line 118 may be a spoolable metal conduit configured to house one or more communication media such as optical fibers, electrical conductors, hydraulic conduits, etc. In certain embodiments, the communication media may operate as energy conductors that facilitate power and data transmission between one or more downhole tools or sensors (not shown) associated with the wellbore tubing 110 and the surface location.

In other embodiments, the communication media themselves may operate as downhole sensors, such as in the case of optical fibers in single mode or multi-mode. For example, when optical fibers are used as the communication media, the optical fibers may be used to obtain distributed measurements along the entire length of the optical fiber, such as distributed temperature or seismic sensing. In optical fiber operation, a pulse of laser light from the surface is sent along the optical fiber and portions of the light are backscattered to the surface due to the optical properties of the fiber. The slightly shifted frequency of the backscattered light provides information that may be used to determine the temperature or vibration at the point in the optical fiber where the backscatter originated. As the speed of light is constant, the distance from the surface to the point where the backscatter originated can also be readily determined. In this manner, continuous monitoring of the backscattered light will provide temperature and/or seismic profile information for the entire length of the optical fiber.

The upper control line 118 may extend along the exterior of the casing 106 until communicating with a casing control line connector 120. The casing control line connector 120 may be at least partially disposed within the casing 106 and may include a casing nipple 122 configured to receive the communication media conveyed in the upper control line 118. As described in more detail below, the casing nipple 122 may include or otherwise have an upper control line connector (not shown) associated therewith and otherwise coupled thereto. The upper control line connector may be a wet mate connector, but may alternatively be a dry mate connector, without departing from the scope of the disclosure. The communication media of the upper control line 118 may be operatively and communicably coupled to the upper control line connector.

The casing nipple 122 may be configured to be operatively coupled to a connector assembly 124 associated with and otherwise coupled to the wellbore tubing 110. The connector assembly 124 may include, provide, or otherwise house a lower control line connector (not shown) configured to mate with the upper control line connector. A lower control line 126 may extend from the connector assembly 124 in the downhole direction along the exterior of the wellbore tubing 110. Similar to the upper control line 118, the lower control line 126 may be a spoolable metal conduit configured to house one or more communication media such as optical fibers, electrical conductors, hydraulic conduits, etc. In some embodiments, the lower control line 126 may extend downhole so that it may be operably associated with the sand control screen assemblies 116a-d. While depicted as being wrapped around the sand control screen assemblies 116a-d, the lower control line 126 may equally be arranged longitudinally (i.e., not wrapped) along at least one of the sand control screen assemblies 116a-d, without departing from the scope of the disclosure.

As discussed in greater detail below, the present disclosure enables the communication media associated with the upper control line 118 to be operatively connected to the communication media associated with the lower control line 126, thereby enabling continuous communication therebetween. More particularly, the lower control line connector associated with the connector assembly 124 may be configured to be operatively coupled to the upper control line connector of the casing nipple 122, thereby establishing a continuous connection between the upper and lower control lines 118, 126. In the case where the communication media includes optical fibers, operatively coupling the upper control line 118 to the lower control line 126 may enable distributed temperature and/or seismic information along the wellbore tubing 110 to be obtained and transmitted to the surface during any subsequent wellbore operations.

Even though FIG. 1 depicts a slanted wellbore, it should be understood by those skilled in the art that the control line connectors according to the present disclosure are equally well suited for use in wellbores having other orientations including vertical wellbores, horizontal wellbores, multilateral wellbores or the like. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure.

Figure 2:
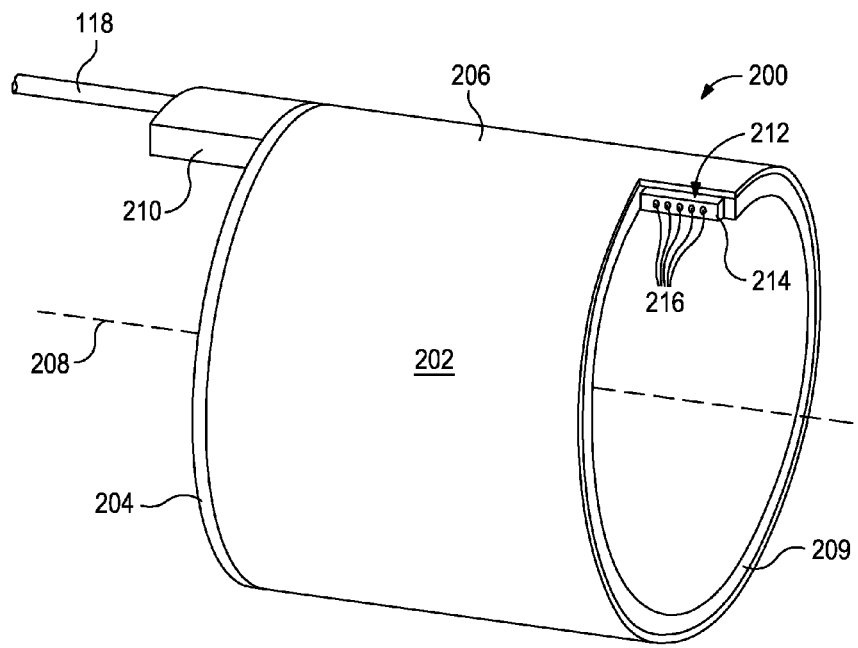
FIG. 2 illustrates an isometric view of an exemplary control line connector, according to one or more embodiments.

Referring now to FIG. 2, with continued reference to FIG. 1, illustrated is an isometric view of an exemplary upper control line connector 200, according to one or more embodiments. In at least one embodiment, the upper control line connector 200 (hereafter "the upper connector 200") may be the upper control line connector associated with the casing nipple 122 of the casing control line connector 120 of FIG. 1. Accordingly, the upper connector 200 may be configured to be communicably and operatively coupled to the lower control line connector of the connector assembly 124 (FIG. 1), which process is described in greater detail below. Once this connection is established, the communication media associated with the upper control line 118 may be communicably coupled to the communication media associated with the lower control line 126 (FIG. 1).

While the terms "upper" and "lower" are used in conjunction with the upper connector 200 and a lower control line connector, respectively, those skilled in the art will readily appreciate that such directional terms are not to be considered limiting to the present disclosure, and are used only for reference and differentiation. Rather, the directional configurations of the upper connector 200 and the lower control line connector may be reversed, without departing from the scope of the disclosure. In some embodiments, for instance, the upper connector 200 may alternatively be associated with the connector assembly 124 or any other downhole tool or tool string associated with the wellbore tubing 110, and the lower control line connector may be operatively coupled to the upper control line 118 and otherwise in direct communication with a surface location. Accordingly, since directional configuration is irrelevant, the upper and lower control line connectors described herein may alternatively be characterized as first and second connectors, respectively, or vice versa.

As illustrated, the upper connector 200 may include an upper housing 202 that encompasses a body 204 and a shroud 206 that extends about the body 204. In some embodiments, the upper housing 202 (e.g., the body 204) may be generally cylindrical and exhibit a central axis 208 that may be substantially concentric with a central axis of the casing nipple 122 (FIG. 1). The shroud 206 may be configured to extend about the outer circumference of the body 204. In some embodiments, the shroud 206 may be configured to hermetically-seal the upper housing 202 so that wellbore fluids are substantially prevented from entering the upper connector 200 and otherwise contaminating the communication media disposed therein. The shroud 206 may be made of any rigid material including, but not limited to, metals, hard plastics, composite materials, and any combination thereof.

An upper axial mating face 209 may be provided and otherwise defined on the upper connector 200. As discussed below, the upper axial mating face 209 may be configured to engage a corresponding lower axial mating face of a lower control line connector upon mating the upper connector 200 with the lower control line connector.

The upper connector 200 may also include a splitter block 210 coupled to the upper housing 202. More particularly, the splitter block 210 may be coupled or attached to the body 204 opposite the upper axial mating face 209. The upper control line 118 may be operatively coupled to the opposing axial face of the splitter block 210 and extend axially therefrom. The splitter block 210 may be coupled to the upper housing 202 in a variety of ways including, but not limited to, welding, brazing, threading, mechanically-fastening (e.g., screws, pins, snap rings, etc.), adhesives, and any combination thereof. The upper control line 118 may be coupled to the splitter block 210 in a similar manner. The splitter block 210 may be configured to receive and separate (i.e., split) the various communication media conveyed within the upper control line 118 and convey said communication media into the upper housing 202. Accordingly, the upper control line 118 may be considered to be operatively coupled to the upper housing 202 via the splitter block 210.

The upper connector 200 may further include a box connector 212. As described below, the box connector 212 may be configured to mate with a pin connector of a lower control line connector. The box connector 212 may be at least partially arranged within the upper housing 202 and include a box mating face 214 that protrudes a short distance out of the upper housing 202. The box mating face 214 may provide or otherwise define one or more holes 216 therein.

As illustrated, the box connector 212 may be arranged with respect to the upper housing 202 such that the box mating face 214 generally faces a tangential direction or tangentially with respect to the curvature of the housing 202 and the body 204. In some embodiments, for instance, the box mating face 214 may be linearly aligned or parallel with the central axis 208 and, therefore, face a truly tangential direction with respect to the housing 202. In other embodiments, however, the box mating face 214 may be slightly offset from parallel with the central axis 208 and, therefore, face a curvilinear direction with respect to the housing 202 and the body 204. As used herein, a component (e.g., the box mating face 214) that "faces tangentially" or faces in a "tangential direction," or any variation thereof, is meant to encompass a truly tangential alignment with another component (e.g., the housing 202), but also any offset alignment with said component, such as a curvilinear alignment, without departing from the scope of the disclosure.

The tangentially-oriented box connector 212 may prove advantageous and otherwise desirable over axially aligned angular mating faces of conventional control line connectors. For instance, tangentially-orienting the box mating face 214 may reduce the potential for the accumulation of dirt, scale, and other wellbore debris on the box mating face 214, which could obstruct the holes 216 and potentially frustrate the connection of the upper connector 200 to a lower control line connector.

Figure 3:
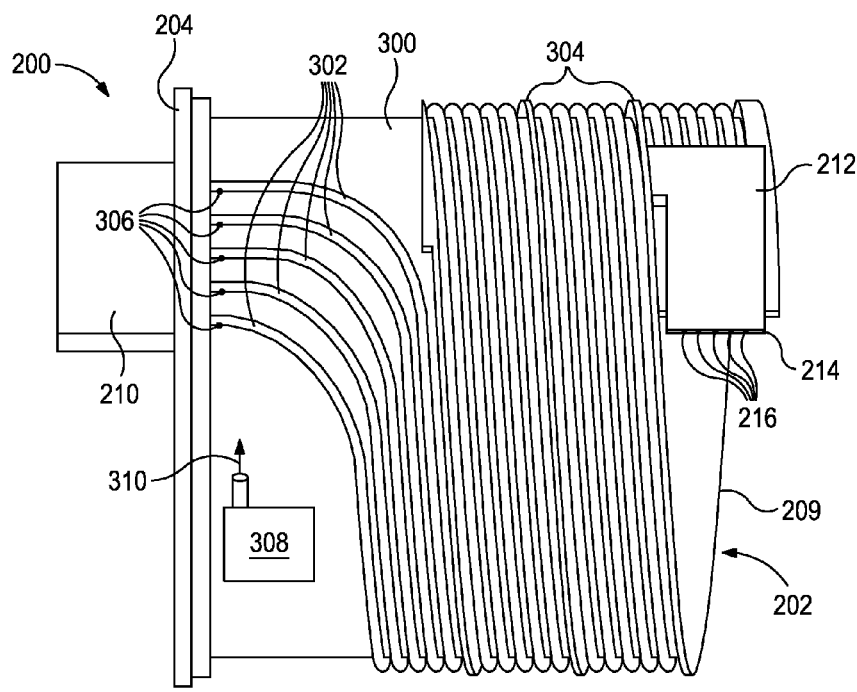
FIG. 3 illustrates an exposed side view of the control line connector of FIG. 2.

Referring now to FIG. 3, with continued reference to FIG. 2, illustrated is an exposed side view of the upper connector 200. More particularly, the shroud 206 (FIG. 2) has been removed in FIG. 3 to expose a conduit chamber 300 of the upper housing 202 that may be defined between the body 204 and the shroud 206. As illustrated, one or more tubular conduits 302 may be arranged within the conduit chamber 300 and extend from the splitter block 210 to the box connector 212. The tubular conduits 302 may each be made of a semi-rigid, corrosion-resistant material such as, but not limited to, metals, plastics, composite materials, and any combination thereof. In at least one embodiment, one or more of the tubular conduits 302 may be made of a nickel steel alloy (e.g., INCOLOY® 825, 925, 945, and INCONEL® 718, G3) or a stainless steel alloy (e.g., stainless steel 316, 304, 410, and 440).

Each tubular conduit 302 may be configured to house a separate communication medium (e.g., an optical fiber, an electrical conductor, hydraulic fluid, etc.) and otherwise provide a passageway to convey the corresponding communication medium between the splitter block 210 and the box connector 212. Moreover, each tubular conduit 302 may be communicably and/or operatively coupled to the box connector 212 such that the corresponding communication medium extending therein is able to extend into the box connector 212. In the case of optical fibers, the optical fiber within a given tubular conduit 302 may be configured to extend at least a short distance into the box connector 212.

The tubular conduits 302 generally serve to protect the communication media extending between the splitter block 210 and the box connector 212. In the illustrated embodiment, five tubular conduits 302 are depicted. Those skilled in the art will readily appreciate, however, that more or less than five tubular conduits 302 (including one) may be employed, without departing from the scope of the disclosure.

In some embodiments, as illustrated, the tubular conduits 302 may be helically wrapped around the body 204 between the splitter block 210 and the box connector 212. In some embodiments, the tubular conduits 302 may be wrapped around the body 204 once. In other embodiments, the tubular conduits 302 may be wrapped around the body 204 more than once, such as twice, three times, or more than three times. In yet other embodiments, the tubular conduits 302 may be wrapped around the body 204 less than a full revolution, such as a ¼ wrap or a ½ wrap around the body 204, without departing from the scope of the disclosure.

Especially in the case of optical fibers, winding the tubular conduits 302 about the body 204 may prove advantageous in reducing column loading on the optical fibers once the upper connector 200 is operatively and communicably coupled to a lower control line connector. More particularly, contacting the opposing ends of optical fibers associated with the upper connector 200 and a lower control line connector may place the optical fibers in axial compression. By wrapping the optical fiber helically around the body 204 (e.g., two, three, four or more revolutions) within the tubular conduits 302, more axial length of the optical fiber is available to assume any potential axial loads. As a result, the optical fiber may experience lower stress levels when properly connected and will therefore be less prone to breakage. Moreover, the inner diameter of the tubular conduits 302 may be greater than the diameter of an optical fiber. Such a loose fit of the optical fiber within the tubular conduits 302 may allow for some movement during mating to prevent high column loading on the optical fiber.

The body 204 may further define or otherwise provide one or more ribs 304 that protrude radially from the outer surface of the body 204 and into the conduit chamber 300. In some embodiments, the shroud 206 (FIG. 2) may be configured to seat against or otherwise be coupled to the ribs 304. Accordingly, the ribs 304 may provide radial support for the shroud 206, and otherwise protect the tubular conduits 302 from compression damage. In the illustrated embodiment, the ribs 304 are depicted as a continuous spiraling length that proceeds helically around the body 204. A corresponding helical passageway may be defined between axially adjacent sections of the spiraling rib 304, and the tubular conduits 302 may be able to extend within the helical passageway. Those skilled in the art will readily appreciate the several different variations of ribs 304 may be employed to accomplish the same ends of radially supporting the shroud 206 and simultaneously protecting the tubular conduits 302 from compression damage. For instance, in some embodiments, the spiraling rib 304 need not be a continuous length but may alternatively encompass two or more spiraled sections.

In some embodiments, the conduit chamber 300 may be filled with an optical gel (not shown) useful in protecting optical fibers that may be disposed within one or more of the tubular conduits 302 from well fluid contamination. In at least one embodiment, as illustrated, one or more of the tubular conduits 302 may provide or otherwise define a gel inlet 306 that allows the optical gel to flow into the corresponding tubular conduit 302 and to the box connector 212. More particularly, upon mating with the pin connector of a lower control line connector (not shown), the box connector 212 may be configured to move a short distance into the upper housing 202 (e.g., the conduit chamber 300). In the illustrated embodiment of FIG. 3, the box connector 212 is depicted in an extended configuration, where the box mating face 214 protrudes a short distance out of the upper housing 202. When properly mated to the pin connector, however, the box connector 212 may be urged into the upper housing 202 until assuming a retracted configuration (shown in FIG. 6 below).

Movement of the box connector 212 to the retracted configuration increases the fluid pressure within the conduit chamber 300, which may hydraulically force optical gel to flow into the tubular conduits 302 via the corresponding gel inlets 306. The box connector 212 may be spring loaded and otherwise biased to maintain the box connector 212 in its extended configuration. Accordingly, upon disconnecting the box connector 212 from the pin connector, the box connector 212 may be configured to autonomously return to the extended configuration. Moving back to the extended configuration, however, may generate a pressure differential between the conduit chamber 300 and the exterior of the upper housing 202. Unless alleviated, this pressure differential could draw in sand, scale or other wellbore debris into the conduit chamber 300.

In order to alleviate the generated pressure differential, in at least one embodiment, the upper connector 200 may further include a gel reservoir 308 configured to inject or otherwise provide additional optical gel 310 into the conduit chamber 300 upon disconnecting the box connector 212. In some embodiments, as illustrated, the gel reservoir 308 may be arranged within the conduit chamber 300. In other embodiments, however, the gel reservoir 308 may be arranged outside of the upper housing 202, but nonetheless in fluid communication with the conduit chamber 300.

The gel reservoir 308 may include a fluid actuator (not shown), such as a piston or a bladder, housed within the gel reservoir 308 and configured to autonomously pump or convey additional optical gel 310 into the conduit chamber 300 upon sensing the pressure differential caused by the disconnection of the box connector 212. Actuation of the fluid actuator may be configured to compensate for the loss of the optical gel into the tubular conduits 302 when the box connector 212 moves back to the extended position. Accordingly, each time the box connector 212 is pumped (i.e., moved between extended and retracted configurations), the fluid actuator may be configured to correspondingly move and provide additional optical gel 310 to the conduit chamber 300 to compensate for the optical gel that previously flowed into the tubular conduits 302.

Figure 4A:
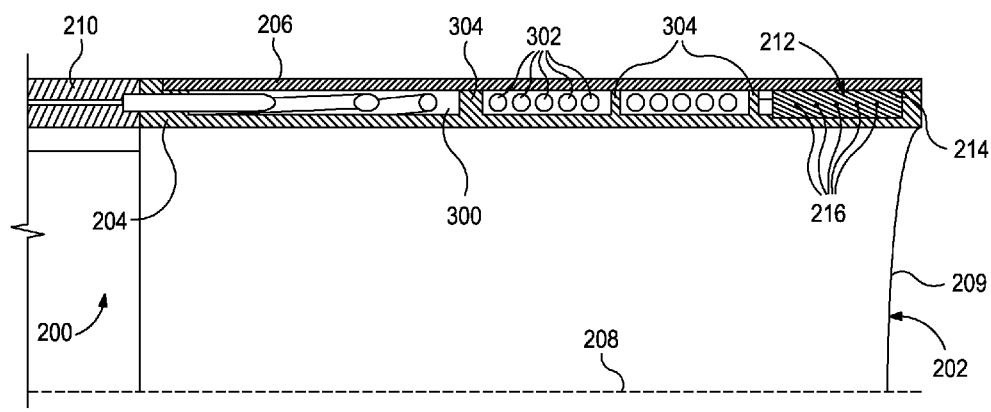
FIG. 4A illustrates a partial side cross-sectional view of the control line connector of FIG. 2, according to one or more embodiments.
Figure 4B:
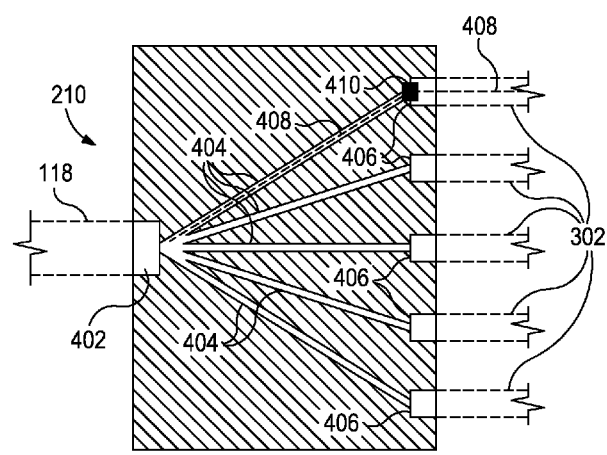
FIG. 4B illustrates a planar cross-sectional view of a splitter block associated with the control line connector of FIGS. 2 and 3, according to one or more embodiments.

Referring now to FIGS. 4A and 4B, with continued reference to FIGS. 2 and 3, illustrated are cross-sectional views of the upper connector 200 and the splitter block 210, respectively, according to one or more embodiments. More particularly, FIG. 4A depicts a partial side cross-sectional view of the upper housing 202 and splitter block 210 of the upper connector 200, and FIG. 4B depicts a planar cross-sectional view of the splitter block 210.

As depicted in FIG. 4A, the shroud 206 may be operatively coupled to the body 204 and the ribs 304. The ribs 304 are also depicted as providing radial support to the shroud 206 and otherwise forming a passageway within the conduit chamber 300. As mentioned above, the tubular conduits 302 may be configured to extend between the splitter block 210 and the box connector 212 within the passageway(s) formed by the ribs 304. The shroud 206 may be coupled to the body 204 (and/or the ribs 304) in a variety of ways including, but not limited to, welding, brazing, threading, mechanically fastening (e.g., screws, pins, snap rings, etc.), adhesives, and any combination thereof. As can be seen in FIG. 4A, the upper connector 200 maintains a low profile (i.e., relatively small radial thickness), which may prove advantageous in downhole applications where radial space is often limited.

Referring to FIG. 4B, the splitter block 210 may include or otherwise define a control line port 402 configured to receive and seat the upper control line 118 (shown in dashed). In at least one embodiment, the upper control line 118 may be coupled to the control line port 402 using a compression fitting, such as a SWAGELOCK® compression fitting. The splitter block 210 may further define or otherwise provide one or more communication media pathways 404 that extend from the control line port 402. The communication media pathways 404 may be drilled into the splitter block 210 or otherwise integrally formed therein during manufacturing (i.e., molds, castings, etc.). Each communication media pathway 404 may be configured to receive and convey a separate communication medium (e.g., an optical fiber, an electrical conductor, hydraulic fluid, etc.) to a corresponding tubular conduit port 406. Each tubular conduit port 406 may be configured to receive and seat a corresponding one of the tubular conduits 302. The tubular conduits 302 may be operatively coupled to a given tubular conduit port 406 via a variety of ways including, but not limited to, welding, brazing, threading, mechanically-fastening (e.g., screws, pins, snap rings, etc.), adhesives, and any combination thereof.

In embodiments where an optical fiber is the communication medium run through a given communication media pathway 404, a pressure seal may be made on the optical fiber to prevent wellbore fluids from entering the given communication media pathway 404. More particularly, an optical fiber 408 is depicted in FIG. 4B as extending within one of the communication media pathways 404. At or near the corresponding tubular conduit port 406, a pressure seal 410 may be generated. The pressure seal 410, for example, may be a glass bead fused to the optical fiber 408 and otherwise sealed into the splitter block 210 to provide a pressure seal capable of withstanding wellbore pressures and any fluid pressure within the upper and lower control lines 118, 126 (FIG. 1).

Figure 5A:
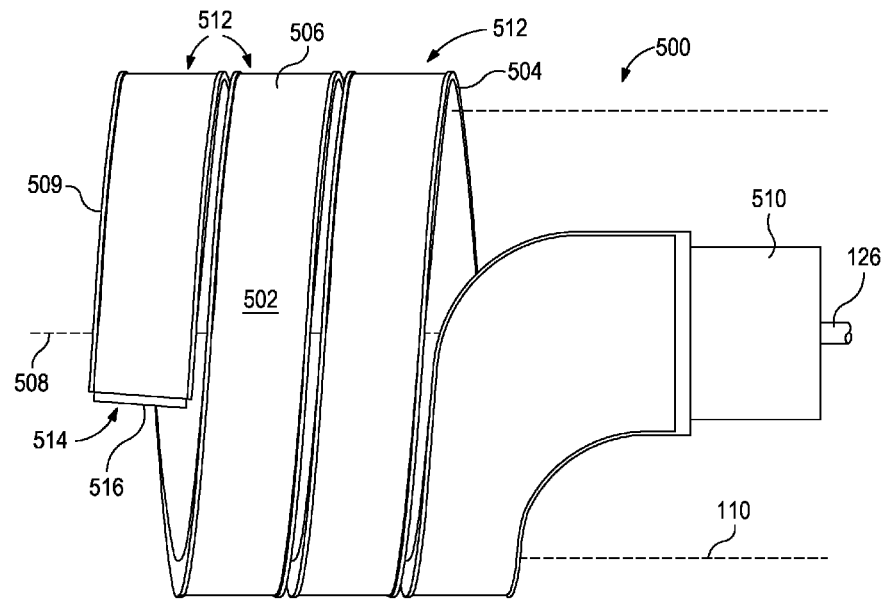
FIGS. 5A and 5B illustrate side and exposed side views of another control line connector, according to one or more embodiments.
Figure 5B:
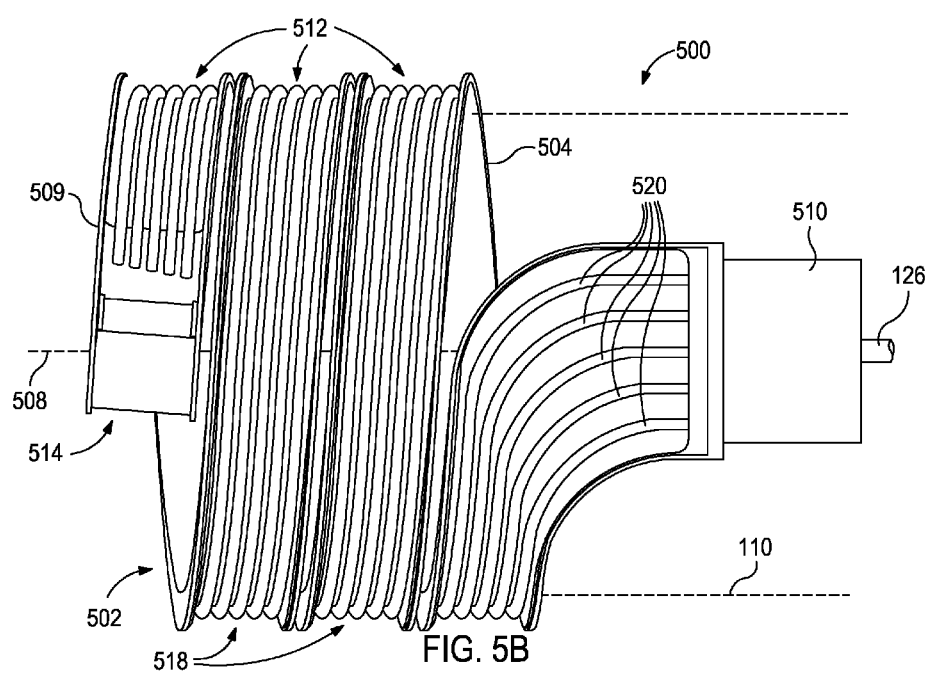

Referring now to FIGS. 5A and 5B, with continued reference to FIGS. 1-3, illustrated are side views of an exemplary lower control line connector 500, according to one or more embodiments. The lower control line connector 500 (hereafter "the lower connector 500") may be the lower control line connector associated with the connector assembly 124 of the casing control line connector 120 of FIG. 1. Accordingly, the lower connector 500 may be configured to be communicably and operatively coupled to the upper connector 200. Once this connection is established, the communication media associated with the upper control line 118 (FIG. 1) may be communicably coupled to the communication media associated with the lower control line 126.

The lower connector 500 may be similar in some respects to the upper connector 200, and therefore may be best understood with reference thereto. For instance, similar to the upper connector 200, the lower connector 500 may include a lower housing 502 that may encompass a body 504 and a shroud 506 that extends about the body 504. The lower housing 502 may be generally cylindrical and have a central axis 508. Moreover, the lower connector 500 may further include a lower axial mating face 509 configured to engage the upper axial mating face 209 (FIGS. 2 and 3) of the upper connector 200, as described below.

The lower connector 500 may also include a splitter block 510 that may be coupled or attached opposite the lower axial mating face 509 of the lower housing 502, and the lower control line 126 may be coupled to the opposing axial face of the splitter block 510 and extend therefrom. The splitter block 510 may be coupled to the lower housing 502 (e.g., the body 504) in a variety of ways including, but not limited to, welding, brazing, threading, mechanically-fastening (e.g., screws, pins, snap rings, etc.), adhesives, and any combination thereof. The lower control line 126 may be coupled to the splitter block 510 in a similar manner. The splitter block 510 may be configured to receive and separate (i.e., split) the various communication media disposed within the lower control line 126 and convey the communication media into the lower housing 502. Accordingly, the lower control line 126 may be considered to be operatively coupled to the lower housing 502 via the splitter block 510.

Unlike the upper connector 200, however, the lower connector 500 may be expandable. More particularly, the housing 502 and the body 504 may be helical or coil-like in construction and may therefore define or otherwise provide one or more windings 512 (three shown). It will be appreciated that any number of windings 512 may be defined by the housing 502 and the body 504, without departing from the scope of the disclosure. In some embodiments, for instance, there may be more or less than three windings 512, such as only one or two. In yet other embodiments, the housing 502 and the body 504 may provide for a winding 512 that extends only a fraction of a single revolution, such as a ¼ wrap or a ½ wrap, without departing from the scope of the disclosure.

The shroud 506 may also be helical or coil-like in construction and configured to extend about the outer circumference of the body 504 and, more particularly, over the windings 512. In some embodiments, the shroud 506 may be configured to hermetically-seal the lower housing 502 so that wellbore fluids are substantially prevented from entering the lower connector 500 and otherwise damaging the communication media disposed therein. The housing 502 may be made of metal or plastic and configured to expand radially outward upon being forced in the radial direction, as described in more detail below.

The lower connector 500 may further include a pin connector 514 configured to mate with the box connector 212 (FIGS. 2 and 3) of the upper connector 200 (FIGS. 2 and 3). The pin connector 514 may include or otherwise define a pin mating face 516. The pin connector 514 may be arranged with respect to the lower housing 502 such that the pin mating face 516 generally faces a tangential direction or tangentially-oriented with respect to the curvature of the lower housing 502 and the body 504. For instance, the pin mating face 516 may be linearly aligned or parallel with the central axis 508 and, therefore, face a truly tangential direction with respect to the lower housing 502. In other embodiments, however, the pin mating face 516 may be slightly offset from parallel with the central axis 508 and, therefore, face in a curvilinear direction with respect to the lower housing 502 and the body 504. As described below, the pin mating face 516 may be configured to engage the box mating face 214 of the box connector 212 during coupling of the upper and lower control line connectors 200, 500. Accordingly, during mating of the upper and lower control line connectors 200, 500, the central axes 208, 508 of the upper and lower housings 202, 502, respectively, may be substantially coaxial.

FIG. 5B is an exposed side view of the lower connector 500, where the shroud 506 and portions of the pin connector 514 (e.g., the pin mating face 516) have been omitted. As illustrated, the lower housing 502 may include a generally helical conduit chamber 518 defined between the body 504 and the shroud 506 of the lower housing 502. Moreover, similar to the upper connector 200 (FIG. 3), one or more tubular conduits 520 may be arranged within the conduit chamber 518 and extend from the splitter block 510 to the pin connector 514. The tubular conduits 520 may be similar to the tubular conduits 302 (FIG. 3) of the upper connector 200. For instance, each tubular conduit 520 may be configured to house a separate communication medium (e.g., an optical fiber, an electrical conductor, hydraulic fluid, etc.) and otherwise provide a passageway to convey the corresponding communication medium between the splitter block 510 and the pin connector 514. Moreover, the tubular conduits 520 are helically wrapped around the body 504 within the windings 512 and extend between the splitter block 510 and the pin connector 514.

The number of tubular conduits 520 disposed in the conduit chamber 518 may match the number of tubular conduits 302 disposed in the conduit chamber 300 (FIG. 3), such that the communication media from the lower control line 126 may be appropriately coupled to the communication media from the upper control line 118 (FIGS. 2 and 3). Those skilled in the art will readily appreciate, however, that more or less than five tubular conduits 520 (including one) may be employed, without departing from the scope of the disclosure. The tubular conduits 520 may each be communicably and operatively coupled to the splitter block 510, which allows the communication media from the lower control line 126 to be separated and extend into corresponding tubular conduits 520. The splitter block 510 may be similar to the splitter block 210 described above with reference to FIGS. 2 and 4B, and therefore will not be described again in detail.

Figure 6:
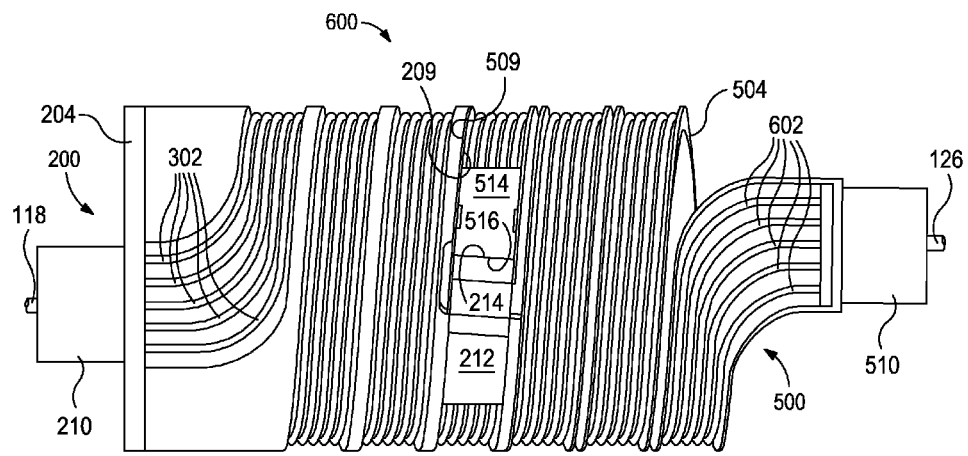
FIG. 6 illustrates an exposed side view of an exemplary control line connector assembly, according to one or more embodiments.

Referring now to FIG. 6, with continued reference to the prior figures, illustrated is a side view of an exemplary control line connector assembly 600, according to one or more embodiments. As illustrated, the control line connector assembly 600 (hereafter "the assembly 600") may include the upper connector 200 and the lower connector 500 of FIGS. 2, 3, and 5A-5B. FIG. 6 depicts the upper and lower connectors 200, 500 in a coupled or mated relationship.

In the coupled relationship, the upper and lower axial mating faces 209, 509 of the upper and lower control line connectors 200, 500, respectively, may be axially engaged. As depicted, the upper and lower axial mating faces 209, 509 may be angled or otherwise complementarily spiraled such that they may be helically aligned similar to the engagement of mechanical threads. One or more grooves, slots, castellations, or other similar structural features (not shown) may be defined on one or both of the upper and lower axial mating faces 209, 509 and may be configured to channel or otherwise move debris away from the upper and lower axial mating faces 209, 509 during mating. Such grooves or slots may prove advantageous in removing debris that may otherwise frustrate proper coupling of the upper and lower control line connectors 200, 500.

To establish a connection between the upper and lower control line connectors 200, 500, the upper and lower axial mating faces 209, 509 may first be brought into axial engagement. This may be accomplished by moving one or both of the upper and lower control line connectors 200, 500 in the axial direction until the upper axial mating face 209 engages the lower axial mating face 509, or vice versa. Once the upper and lower axial mating faces 209, 509 are axially engaged, one or both of the upper and lower control line connectors 200, 500 may be angularly rotated with respect to each other in order to bring the pin mating face 516 into angular engagement and alignment with the box mating face 214. The angle or spiraled construction of each axial mating face 209, 509 allows the upper and lower control line connectors 200, 500 to be aligned axially and rotated until the box mating face 214 is rotationally aligned and engaged with the pin mating face 516.

The assembly 600 may prove advantageous in having the box and pin mating faces 214, 516 arranged away from the axial direction where sand, scale, and other wellbore debris may otherwise obstruct proper connection between the upper and lower control line connectors 200, 500. Rather, the box and pin mating faces 214, 516 of the assembly 600 are configured to be angularly aligned (or curvilinearly aligned) and subsequently mated with angular rotation instead of axial translation. Accordingly, the box and pin mating faces 214, 516 may be referred to herein as "angular" mating faces, as opposed to the axial mating faces 209, 509. Further angular rotation of one or both of the upper and lower control line connectors 200, 500 may serve to fully mate the box and pin connectors 212, 514 and thereby establish a connection between the communication media of the upper and lower control lines 118, 126.

In some embodiments, angular rotation of one or both of the upper and lower control line connectors 200, 500 may be accomplished by manually rotating one or both of the upper and lower control line connectors 200, 500. This may be done, for example, by rig hands on a rig floor. In other embodiments, the required angular rotation may be accomplished by solely rotating the lower connector 500 as connected to the wellbore tubing 110 (FIG. 1) from a surface location. In yet other embodiments, the required angular rotation may be achieved by allowing gravitational forces to act on the angled axial mating faces 209, 509. More particularly, the angle of the axial mating faces 209, 509 may allow axial loading assumed by the upper and lower control line connectors 200, 500 to be converted into angular rotation of the upper and lower control line connectors 200, 500 as the axial mating faces 209, 509 slidingly engage each other.

Figure 7A:
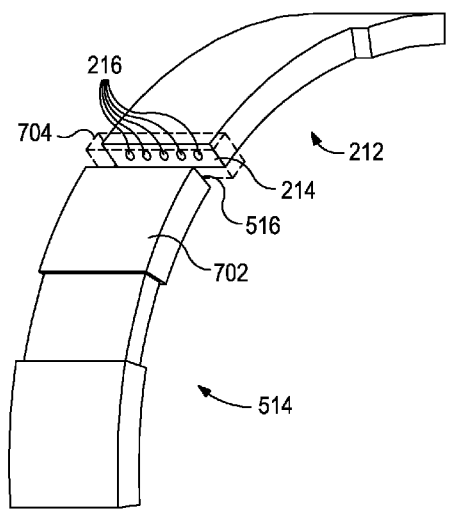
FIGS. 7A and 7B illustrate isometric views of box and pin connectors of FIGS. 5 and 6, according to one or more embodiments.
Figure 7B:
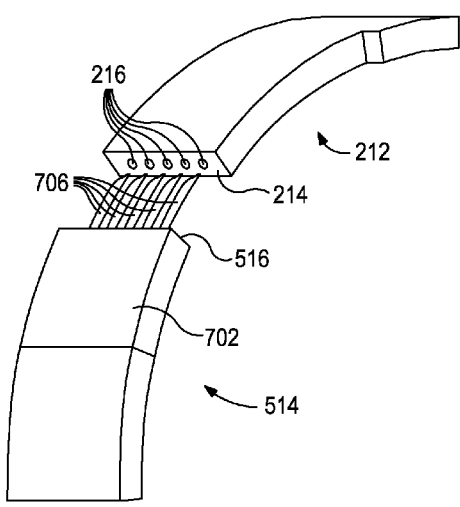

Referring now to FIGS. 7A and 7B, with continued reference to FIG. 6, illustrated are cross-sectional isometric views of the box connector 212 and the pin connector 514, according to one or more embodiments. More particularly, the box connector 212 and the pin connector 514 are depicted in angular (or curvilinear) alignment and otherwise prepared to be mated in accordance with the present disclosure. The remaining portions of the upper and lower control line connectors 200, 500 are omitted for clarity.

As illustrated, the pin connector 514 may include a retractable cover 702 that is movable between an extended configuration, as shown in FIG. 7A, and a retracted configuration, as shown in FIG. 7B. In some embodiments, the retractable cover 702 may be spring biased or otherwise naturally biased to the extended configuration. In other embodiments, the retractable cover 702 may be pinned or otherwise secured in the extended configuration with one or more shearable devices (not shown), such as one or more shear pins or rings. In order to move the retractable cover 702 to the retracted configuration, an axial load may be applied on the retractable cover 702 until the spring force is overcome or the associated shearable device(s) fails.

The pin mating face 516 may be defined on the end of the retractable cover 702 and otherwise configured to engage the box mating face 214 of the box connector 212. In some embodiments, the box mating face 214 may be sealed in order to protect the one or more holes 216 defined in the box connector 212 from the inadvertent influx of sand, scale, and/or other wellbore debris. In one embodiment, the box connector 212 may include a lid 704 (shown in dashed) that may be used to seal the box mating face 214. While shown in FIG. 7A as extending about the end of the box connector 212, the lid 704 may equally be a plate secured to the box mating face 214, without departing from the scope of the disclosure. In other embodiments, box mating face 214 may be sealed by arranging a plug within each hole 216. Similar to the function of the lid 704, the plugs may be configured to prevent the inadvertent influx of wellbore debris into the holes 216. In yet other embodiments, a combination of both the lid 704 and plugs disposed in the holes 216 may be used, without departing from the scope of the disclosure. The sealing properties of the lid 704 or plugs may be characterized as a sealing interface on the box mating face 214.

Referring to FIG. 7B, the pin connector 514 may further include one or more hypodermic tubes 706 that extend from the pin connector 514. Each hypodermic tube 706 may be a needle-like structure that defines a central passageway that facilitates the conveyance of communication media (e.g., optical fiber) therethrough. As illustrated, when the retractable cover 702 is in its extended configuration (FIG. 7A), the hypodermic tubes 706 may be generally housed within the retractable cover 702. While moving the retractable cover 702 to its retracted configuration (FIG. 7B), however, the hypodermic tubes 706 may be configured to penetrate the pin mating face 516 and thereby extend out of the retractable cover 702. Accordingly, at least the pin mating face 516 of the retractable cover 702 may be made of a semi-rigid material, such as rubber, that may be able to be penetrated by the hypodermic tubes 706. Moreover, the hypodermic tubes 706 may be made of a material that is rigid enough to penetrate the material of the pin mating face 516, such as a metal or a plastic.

In FIG. 7B, the retractable cover 702 is depicted in its retracted configuration and the lid 704 is omitted for convenience in viewing the hypodermic tubes 706. In exemplary operation, however, the retractable cover 702 may be moved from the extended configuration to the retracted configuration through engagement between the pin mating face 516 and the box mating face 214. More particularly, and with brief reference again to FIG. 6, once the upper and lower axial mating faces 209, 509 are axially engaged, one or both of the upper and lower control line connectors 200, 500 may be angularly rotated with respect to each other. Rotating the upper and lower control line connectors 200, 500 may bring the pin mating face 516 into angular alignment and engagement with the box mating face 214. Further angular rotation of one or both of the upper and lower control line connectors 200, 500 may overcome the spring force of the retractable cover 702 (or otherwise shear any shearable devices used to secure the retractable cover 702 in place) and begin to move the retractable cover 702 from its extended configuration to its retracted configuration. As the retractable cover 702 is moved to the retracted configuration, the hypodermic tubes 706 may penetrate and otherwise extend through the pin mating face 516.

During this process, and as the retractable cover 702 moves to the retracted configuration, the pin mating face 516 remains in contact with the box mating face 214. After penetrating the pin mating face 516, continued angular rotation of one or both of the upper and lower control line connectors 200, 500 may force the hypodermic tubes 706 into the corresponding holes 216 defined on the box connector 212. In the event the box connector 212 further utilizes the lid 704 (FIG. 7A), or plugs disposed within the holes 216, the hypodermic tubes 706 may further be configured to penetrate such structures. Accordingly, the lid 704 and the plugs may also be made of a semi-rigid material, such as rubber, that may be penetrated by the hypodermic tubes 706.

After penetrating the lid 704 (or plugs in the holes 216), the hypodermic tubes 706 may proceed to extend into the box connector 212, and thereby provide a conduit from the pin connector 514 to the box connector 212 for the introduction and/or coupling of communication media. As will be appreciated, the hypodermic tubes 706 may prove advantageous in preventing debris from fouling the connection between the box and pin connectors 212, 514. More particularly, having the hypodermic tubes 706 penetrate the pin and box mating faces 516, 214 may serve to wipe the hypodermic tubes 706 clean from wellbore debris such that an unobstructed communication media connection may be achieved within the box connector 212.

Referring now to FIGS. 8A and 8B, with continued reference to FIGS. 7A-7B, illustrated are cross-sectional side views of the box connector 212 and the pin connector 514, according to one or more embodiments. More particularly, FIG. 8A depicts the box connector 212 and the pin connector 514 in a separated configuration, and FIG. 8B depicts the box connector 212 and the pin connector 514 in a mated configuration. Similar to FIG. 7B, the retractable cover 702 in FIG. 8A is depicted in its retracted configuration, but would otherwise be moved to the retracted configuration upon engagement with the box mating face 214. Moreover, the lid 704 (FIG. 7A) is also omitted, but could otherwise be included to seal the box mating face 214.

As illustrated, the box connector 212 may further include a needle guide 802 and an alignment feature 804. During mating, the needle guide 802 may be configured to receive and align the one or more hypodermic tubes 706 with the alignment feature 804. In FIG. 8B, the hypodermic tube 706 is depicted as being received within the needle guide 802. As will be appreciated, the number of needle guides 802 defined in the box connector 212 may equal the number of hypodermic tubes 706. In the embodiment shown in FIGS. 7A and 7B, for instance, the box connector 212 would include five needle guides 802 in order to accommodate the five hypodermic tubes 706. Embodiments are contemplated herein, however, where the pin connector 514 includes more or less than five hypodermic tubes 706 (including one), therefore necessitating a corresponding more or less than five needle guides 802 in the box connector 212, without departing from the scope of the disclosure.

The alignment feature 804 may extend from or otherwise communicate with the needle guide 802 within the box connector 212. Accordingly, the number of alignment features 804 provided in the box connector 212 may be equal to the number of needle guides 802. Each alignment feature 804 may be configured to align a corresponding communication media (e.g., optical fiber, electrical conductor, hydraulic fluid, etc.) extending from the pin connector 514 with the communication media extending within the box connector 212. In some embodiments, the box connector 212 may encompass two halves that can be mated together, and the alignment feature 804 may be a milled, cast, or molded channel defined in the opposing halves. The channel may assume an arcuate or arced shape that accommodates the curvature of the box connector 212. Moreover, in at least one embodiment, the diameter or size of the channel may be designed so as to accommodate a single optical fiber. For instance, the diameter of the channel may be about 0.010 inches.

In other embodiments, however, the alignment feature 804 may be made of or defined by a set of elongate geometric shapes disposed within or otherwise forming an integral part of the box connector 212. For instance, as depicted in the inset graphic of FIG. 8A, the alignment feature 804 may encompass at least three cylinders or rods 806 that may be tightly packed together so as to define an elongate gap 808 therebetween. Similar to the dimensions of the channel discussed above, the size of the resulting elongate gap 808 may be large enough and otherwise designed to accommodate the thickness of a single optical fiber (e.g., about 0.010 inches). Moreover, in order to accommodate the curvature of the box connector 212, the rods 806 may be bent or arcuate in shape.

As illustrated, the pin connector 514 may further provide or otherwise define one or more communication paths 810 that lead to a corresponding one or more conduit seats 812. Each conduit seat 812 (one shown) may be configured to receive and seat a corresponding hypodermic tube 706. Accordingly, the number of conduit seats 812 provided in the pin connector 514 may be equal to the number of hypodermic tubes 706 employed. The communication paths 810 may be configured to convey the communication media (e.g., optical fiber, electrical conductor, hydraulic fluid, etc.) into the corresponding hypodermic tubes 706.

An exemplary process or method of mating the box connector 212 and the pin connector 514 is now provided. Successfully mating the box and pin connectors 212, 514 may result in the successful mating of communication media (e.g., optical fibers, electrical conductors, hydraulic fluids or conduits, etc.) extending between the box and pin connectors 212, 514. In the embodiment depicted in FIGS. 8A and 8B, an optical fiber connection is to be generated by mating the box and pin connectors 212, 514. More particularly, a first optical fiber 814a is depicted as extending within the pin connector 514 and at least partially into the hypodermic tube 706. In at least one embodiment, the first optical fiber 814a may originate from the lower control line 126 (FIGS. 1 and 6) as extended through the splitter block 510 (FIG. 6) and corresponding one of the tubular conduits 520 (FIG. 6). A second optical fiber 814b is also depicted as extending within the box connector 212 and at least partially into the alignment feature 804. In at least one embodiment, the second optical fiber 814b may originate from the upper control line 118 (FIG. 6) as extended through the splitter block 210 (FIG. 6) and corresponding one of the tubular conduits 302 (FIG. 6).

In FIG. 8A, the retractable cover 702 is again depicted in its retracted configuration, but would otherwise be moved from the extended configuration to the retracted configuration via engagement between the pin mating face 516 and the box mating face 214. Once the pin mating face 516 is brought into angular alignment and/or engagement with the box mating face 214, as generally described above, further angular rotation of one or both of the upper and lower control line connectors 200, 500 (FIG. 6) may commence moving the retractable cover 702 from its extended configuration to its retracted configuration. In some embodiments, as discussed above, the angular rotation may overcome the spring force of the retractable cover 702. In other embodiments, however, the angular rotation may serve to shear the shearable device(s) used to secure the retractable cover 702 in place. As the retractable cover 702 is moved to the retracted configuration, the hypodermic tubes 706 may be forced to penetrate and otherwise extend through the pin mating face 516.

In FIG. 8B, after penetrating the pin mating face 516, continued angular rotation of one or both of the upper and lower control line connectors 200, 500 (FIG. 6) may force the hypodermic tubes 706 into the corresponding holes 216 and needle guides 802 defined in the box connector 212. Once extended into the needle guides 802, the hypodermic tubes 706 may facilitate a continuous conduit that extends from the pin connector 514 to the box connector 212 in order to optically communicate the first and second optical fibers 814a,b. Further angular rotation of one or both of the upper and lower control line connectors 200, 500 (FIG. 6) may allow the first and second optical fibers 814a,b to extend toward each other within the alignment feature 804.

More particularly, added angular rotation by one or both of the upper and lower control line connectors 200, 500 (FIG. 6) may force or move the pin connector 514 back into the lower housing 502 (FIG. 5A) of the lower connector 500 a short distance. Such movement of the pin connector 514 may allow the first optical fiber 814a to telescope or extend out of the corresponding hypodermic tube 706, through the needle guide 802 of the box connector 212 and into the alignment feature 804. Likewise, added angular rotation by one or both of the upper and lower control line connectors 200, 500 may also force or move the box connector 212 back into the upper housing 202 (FIGS. 2 and 3) of the upper connector 200 a short distance. Such movement of the box connector 212 may allow the second optical fiber 814b to extend further into the alignment feature 804 and into optical communication with the first optical fiber 814a. Accordingly, during the mating process, the first and second optical fibers 814a,b may be configured to remain stationary while the pin and box connectors 514, 212 move further into their respective housings 202, 502. Moreover, as discussed above, movement of the box connector 212 may also pump optical gel into the corresponding tubular conduits 302 (FIGS. 3 and 6) and subsequently into the box connector 212.

In some embodiments, the first and second optical fibers 814a,b may be moved into contact with each other within the alignment feature 804. As discussed above, contacting the first and second optical fibers 814a,b may place the optical fibers 814a,b in axial compression. However, since the first and second optical fibers 814a,b may be helically wrapped around their respective bodies 504, 204 within corresponding tubular conduits 520, 302, more axial length of the optical fibers 814a,b is available to assume any potential axial loads. As a result, the first and second optical fibers 814a,b may experience lower stress levels when properly connected.

In other embodiments, however, the first and second optical fibers 814a,b may be in optical communication with each other within the alignment feature 804, but not into physical contact with each other. In such embodiments, the inner wall of the alignment feature 804 may be cladded or otherwise configured to provide total internal reflection between the first and second optical fibers 814a,b. As a result, optical communication between the first and second optical fibers 814a,b may nonetheless be achieved.

It should be noted that while the box and pin connectors 212, 514 are described herein as associated with the upper and lower connectors 200, 500, respectively, it will be appreciated that the configuration of the box and pin connectors 212, 514 may be reversed, without departing from the scope of the disclosure. More specifically, embodiments are contemplated herein where the box connector 212 is alternatively associated with the lower connector 500, and the pin connector 514 is alternatively associated with the upper connector 200.

Referring now to FIG. 9, with continued reference to FIGS. 1-3, illustrated is a cross-sectional side view of an exemplary casing nipple 900, according to one or more embodiments. The casing nipple 900 may be similar to the casing nipple 122 of FIG. 1 and, therefore, may form part of the casing control line connector 120 (FIG. 1) described above. Moreover, the casing nipple 900 may be configured to be operatively coupled to a connector assembly, such as the connector assembly 124 of FIG. 1.

As illustrated, the casing nipple 900 may be arranged in or otherwise form part of a casing 902 arranged within a wellbore 904. The casing 902 may be secured within the wellbore 904 with cement 906. The casing nipple 900 may be placed at any point along the length of the casing 902. In at least one embodiment, however, the casing nipple 900 may be arranged at or near the bottom or "toe" of the casing 902. The casing nipple 900 may further include a selective nipple profile 908 configured to mate with and otherwise be operatively coupled to a corresponding anchor profile (not shown) of a connector assembly. Accordingly, the nipple profile 908 may exhibit any number of grooves, protrusions, definitions, etc., in order facilitate the selective mating of a connector assembly to the casing nipple 900.

The upper connector 200 may be coupled to or otherwise attached to the casing nipple 900. In some embodiments, as illustrated, the upper connector 200 may be arranged within a recess 910 defined on the inner surface of the casing nipple 900. The upper control line 118 may extend to the upper connector 200 such that the communication media associated therewith may be communicably coupled to the box connector 212. As depicted, the upper control line 118 may extend to the upper connector 200 on the outside of the casing 902 and otherwise within the cement 906. Those skilled in the art will readily appreciate that running the upper control line 118 outside of the casing 902 may prove advantageous. For instance, the upper control line 118 would otherwise be disposed within the casing 902, which could potentially obstruct wellbore tools or devices introduced downhole via the casing 902.

In some embodiments, the casing nipple 900 may further include a sleeve 912 (shown in dashed lines) disposed within the casing 902. The sleeve 912 may be a sliding sleeve, for example, and movable between a closed position, where the sleeve 912 occludes one or both of the nipple profile 908 and the recess 910, and an open position, where the sleeve 912 has axially moved to expose the nipple profile 908 and/or the recess 910. In the depicted embodiment, the sleeve 912 is shown in its closed position. The sleeve 912 may prove advantageous in preventing cement slurry from lodging in the nipple profile 908 and/or the recess 910 during the cementing process that forms the cement 906. Upon introducing a connector assembly into the casing 902, as discussed below, the sleeve 912 may be axially moved within the casing 902 to expose the nipple profile 908 and/or the recess 910.

Figure 10:
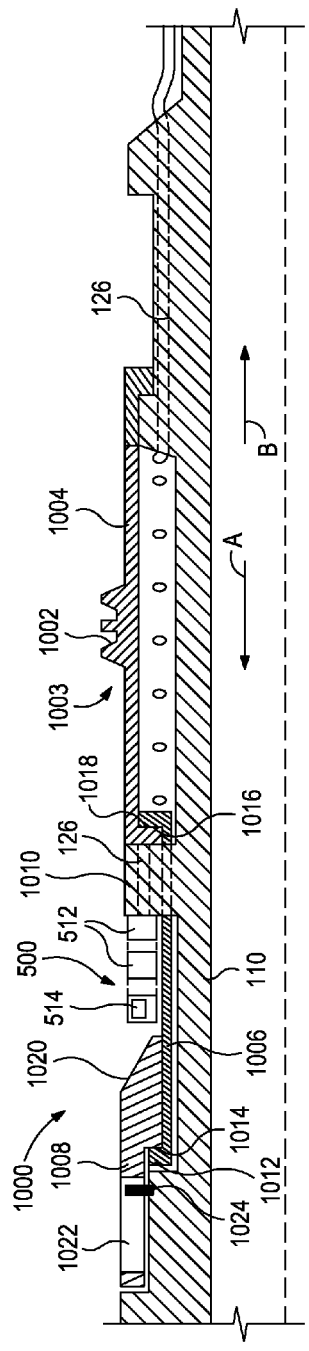
FIG. 10 illustrates a cross-sectional side view of an exemplary connector assembly, according to one or more embodiments.

Referring now to FIG. 10, with continued reference to FIGS. 1-3, 5A-5B, and 9, illustrated is a cross-sectional side view of an exemplary connector assembly 1000, according to one or more embodiments. The connector assembly 1000 may be similar to the connector assembly 124 of FIG. 1 and, therefore, may form part of the casing control line connector 120 (FIG. 1) described above. Moreover, the connector assembly 1000 may be configured to be operatively coupled to a casing nipple, such as one or both of the casing nipples 122, 900 of FIGS. 1 and 9, respectively. As illustrated, the connector assembly 1000 may be operatively coupled to the wellbore tubing 110 and may have the lower connector 500 coupled or otherwise attached thereto. The lower control line 126 may be communicably coupled to the lower connector 500 and extend axially therefrom along the exterior of the wellbore tubing 110.

The connector assembly 1000 may further include a selective anchor profile 1002 configured to mate with and otherwise be operatively coupled to a corresponding nipple profile of a casing nipple, such as the nipple profile 908 of the casing nipple 900 of FIG. 9. Accordingly, the anchor profile 1002 may exhibit any number of grooves, protrusions, definitions, etc., in order facilitate the selective mating of the connector assembly 1000 to a casing nipple. In some embodiments, as illustrated, the anchor profile 1002 may be defined on an outer surface of a collet 1003 that includes a plurality of longitudinally extending collet fingers 1004. In at least one embodiment, as illustrated, the lower control line 126 may be coiled (i.e., helically wrapped) about the wellbore tubing 110 beneath the collet 1003.

In some embodiments, the connector assembly 1000 may further include a connector sleeve 1006 and an expander cone 1008. In one embodiment, the lower connector 500 may be disposed about the connector sleeve 1006 between the expander cone 1008 and a radial stop 1010 defined on and otherwise extending radially outward from the wellbore tubing 110. At a first or uphole end, the connector sleeve 1006 may provide a first radial shoulder 1012 configured to engage an opposing radial shoulder 1014 defined on the expander cone 1008. At a second or downhole end, the connector sleeve 1006 may provide a second radial shoulder 1016 configured to engage an opposing radial shoulder 1018 defined on the collet fingers 1004.

With continued reference to the casing nipple 900 of FIG. 9, exemplary operation of the connector assembly 1000 will now be provided. In one or more embodiments, the anchor profile 1002 may be configured to locate and engage the nipple profile 908 while moving in a direction A with reference to the casing 902. In at least one embodiment, the connector assembly 1000 may be configured to be extended past the casing nipple 900 in the direction B opposite the direction A), and then pulled back upward in the direction A until locating the casing nipple 900. Once the anchor profile 1002 successfully mates with the nipple profile 908, axial movement of the collet 1003 and the associated collet fingers 1004 in the direction A ceases, but the wellbore tubing 110 may continue to move in the direction A. Since the first and second radial shoulders 1012, 1016 of the connector sleeve 1006 are axially engaged with the opposing radial shoulders 1014, 1018 of the expander cone 1008 and the collet fingers 1004, respectively, axial movement of the expander cone 1008 and the connector sleeve 1006 in the direction A also ceases.

Since the lower connector 500 is axially engaged with the radial stop 1010, continued movement of the wellbore tubing 110 in the direction A may also move the lower connector 500 in the direction A. Moving the lower connector 500 in the direction A may urge the lower connector 500 into engagement with the expander cone 1008 and, more particularly, up an angled surface 1020 defined on the expander cone 1008. Since the lower connector 500 exhibits a helical or coil-like construction that provides one or more windings 512, as described above, the lower connector 500 may be configured to expand radially outward as it engages and is forced to slidingly engage and climb the angled surface 1020 of the expander cone 1008. Expanding the lower connector 500 may be configured to axially and radially align the upper and lower connectors 200, 500.

Expanding the lower connector 500 may also angularly align the pin connector 514 with the box connector 212 of the upper connector 200. More particularly, expanding the lower connector 500 may move the pin connector 514 into the recess 910 defined on the inner surface of the casing nipple 900. Once the box and pin connectors 212, 514 are angularly aligned, the lower connector 500 may be rotated in order to mate the upper and lower connectors 200, 500, as described herein above. In some embodiments, the lower connector 500 may be rotated by rotating the wellbore tubing 110, such as from a surface location (not shown). In other embodiments, the expander cone 1008 may be configured to help facilitate rotation of the lower connector 500.

More specifically, the expander cone 1008 may further include an arcuate groove 1022 and a guide pin 1024. The guide pin 1024 may be coupled to the wellbore tubing 110 and extend radially outward therefrom and through the arcuate groove 1022. The expander cone 1008 may be movably mounted on the wellbore tubing 110 and otherwise able to rotationally translate with respect thereto. One or more radial bearings or bushings (not shown) may be arranged between the expander cone 1008 and the wellbore tubing in order to help facilitate rotational movement of the expander cone 1008 and, therefore, the lower connector 500. Once the lower connector 500 is seated on the expander cone 1008, continued axial movement in the direction A may urge the expander cone 1008 and the lower connector 500 to rotate as the guide pin 1024 follows the arcuate groove 1128. The arcuate groove 1128 may also prove advantageous in limiting the amount of angular rotation that the lower connector 500 may assume.

Figure 11:
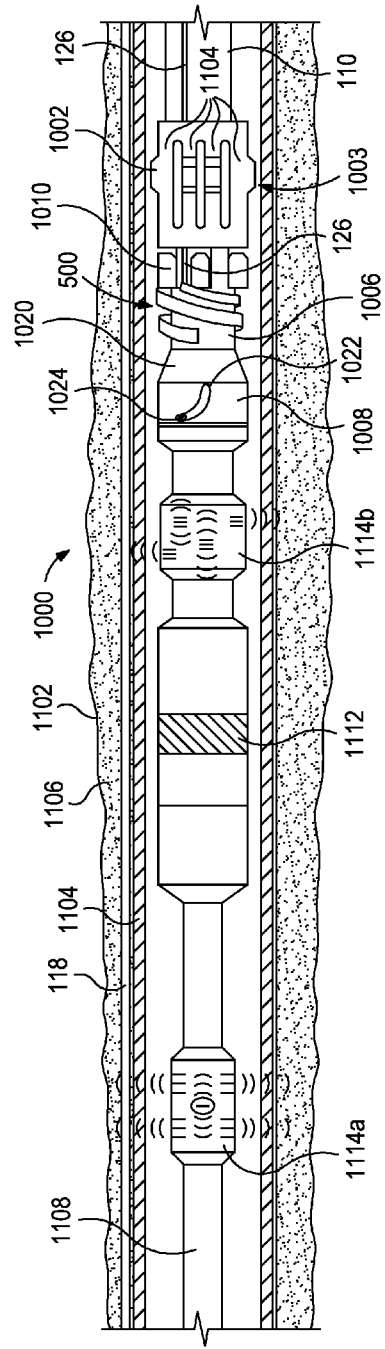
FIG. 11 depicts a view of the connector assembly of FIG. 10 as disposed within a wellbore, according to one or more embodiments.

Referring now to FIG. 11, with continued reference to FIGS. 9 and 10, illustrated is a view of the connector assembly 1000 of FIG. 10 as disposed within a wellbore 1102, according to one or more embodiments. As illustrated, the wellbore 1102 may be lined with casing 1104 and the casing 1104 may be secured within the wellbore 1102 with cement 1106. The upper control line 118 is shown as extending along the outside of the casing 1104 and otherwise within the cement 1106.

The connector assembly 1000 may be arranged on or otherwise operatively coupled to the wellbore tubing 110 and extended downhole on a conveyance 1108, such as drill pipe, production tubing, or any other type of work string used by those skilled in the art. The lower connector 500 is depicted as extending about the wellbore tubing 110 and/or the connector sleeve 1006 and otherwise being disposed between the expander cone 1008 and the radial stop 1010. The lower control line 126 may be communicably coupled to the lower connector 500 and extend axially therefrom along the exterior of the wellbore tubing 110. FIG. 11 also depicts the collet 1003 that may include the selective anchor profile 1002 defined on its outer surface and, more particularly, on the associated plurality of collet fingers 1004. Also depicted is the guide pin 1024 as extended through the arcuate groove 1022 in the expander cone 1008.

The connector assembly 1000 may further include a wellbore isolation device 1112 arranged on the wellbore tubing 110 or the conveyance 1108. The wellbore isolation device 1112 may be similar to the wellbore isolation device 112 of FIG. 1 and may be configured to engage the inner wall of the casing 1104 and thereby provide fluid isolation between portions of the wellbore 1102 above and below the wellbore isolation device 1112. In some embodiments, the wellbore isolation device 1112 may further be configured to secure the wellbore tubing 110 within the casing 1104 so that the wellbore tubing 110 may be "hung" off within the wellbore 1102.

In some embodiments, one or more sonic tools 1114 (two shown as first and second sonic tools 1114a,b) may be included in the connector assembly 1000 and separated from the collet 1003 and/or the lower connector 500 by a predetermined axial distance. The sonic tools 1114a,b may be configured to emit signals that may be sensed or otherwise detected by the upper control line 118 extending to a surface location. More particularly, the sonic tools 1114a,b may be configured to emit acoustic signals (i.e., sonic vibrations) that may be detected by one or more optical fibers associated with the upper control line 118. As a result, a well operator at the surface location may be apprised of the real-time location of the connector assembly 1000 within the wellbore 1102 by monitoring the signals detected in the upper control line 118. As can be appreciated, this may prove advantageous in knowing where the connector assembly 1000 is located with respect to a casing nipple (e.g., the casing nipple 900 of FIG. 9).

Figure 12:
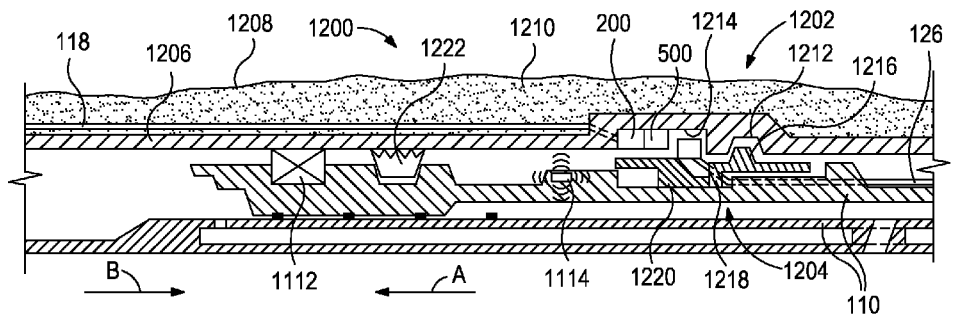
FIG. 12 illustrates an exemplary casing control line connector, according to one or more embodiments.

Referring now to FIG. 12, with continued reference to FIGS. 9-11, illustrated is an exemplary casing control line connector 1200, according to one or more embodiments. The casing control line connector 1200 may be similar in some respects to the casing control line connector 120 of FIG. 1. In the illustrated embodiment, the casing control line connector 1200 may include a casing nipple 1202 and a connector assembly 1204 configured to locate and mate with the casing nipple 1202.

The casing nipple 1202 may be similar to the casing nipple 900 of FIG. 9. For instance, the casing nipple 1202 may be arranged in or otherwise form part of a casing 1206 arranged within a wellbore 1208 and secured therein with cement 1210. The casing nipple 1202 may further include a selective nipple profile 1212, similar in some respects to the nipple profile 908 of FIG. 9. The upper connector 200 may be coupled to or otherwise attached to the casing nipple 1202 and, in some embodiments, may be arranged within a recess 1214 defined on the inner surface of the casing nipple 1202. The upper control line 118 may extend to the upper connector 200 on the outside of the casing 1206 and otherwise within the cement 1210 such that the communication media associated therewith may be communicably coupled to the box connector 212 (not labeled).

The connector assembly 1204 may be substantially similar to the connector assembly 1000 of FIG. 10. For instance, the connector assembly 1204 may be operatively coupled to the wellbore tubing 110 and may have the lower connector 500 coupled or otherwise attached thereto. The lower control line 126 may be communicably coupled to the lower connector 500 and extend axially therefrom along the exterior of the wellbore tubing 110. The connector assembly 1204 may further include a selective anchor profile 1216, similar to the anchor profile 1002 of FIG. 10, and otherwise configured to locate and be operatively coupled to the nipple profile 1212. The connector assembly 1204 may also include a connector sleeve 1218 and an expander cone 1220. In some embodiments, the anchor profile 1216 may be defined on a collet (not shown), similar to the collet 1003 of FIG. 10, but, in other embodiments, as illustrated, the anchor profile 1216 may be defined on the connector sleeve 1218, without departing from the scope of the disclosure. The connector assembly 1204 may further include the wellbore isolation device 1112 arranged on the wellbore tubing 110 and at least one sonic tool 1114, as described above in FIG. 12. As illustrated, the wellbore isolation device 1112 may include one or more slips 1222 configured to engage the inner wall of the casing 1206 and thereby secure the wellbore tubing 110 therein.

In order to mate the upper and lower connectors 200, 500, and thereby communicably couple the upper and lower control lines 118, 126, the connector assembly 1204 may be introduced into the wellbore 1208 (i.e., the casing 1206) in a first or downhole direction B. While the connector assembly 1204 moves within the casing 1206, the sonic tool 1114 may be configured to continuously or intermittently emit acoustic signals that may be sensed and otherwise detected by one or more optical fibers associated with the upper control line 118. As a result, a well operator at a remote or surface location may be able to ascertain the real-time location of the connector assembly 1204 and the wellbore tubing 110 with respect to the casing nipple 1202 as they descend into the wellbore 1208.

In some embodiments, the anchor profile 1216 may be configured to locate and engage the nipple profile 1212 while moving in the direction B within the casing 1206. In other embodiments, however, the anchor profile 1216 may be configured to be extended past the casing nipple 1202 and then pulled back upward in the direction A until locating the casing nipple 1202. In at least one embodiment, the well operator may be apprised of when the anchor profile 1216 passes the casing nipple 1202 when the upper control line 118 ceases registering acoustic signals emitted from the sonic tool 1114.

Once the anchor profile 1216 successfully mates with the nipple profile 1212, continued axial movement of the wellbore tubing 110 in the direction A may force the lower connector to engage the expander cone 1220, which radially expands the lower connector 500 until the upper and lower connectors 200, 500 are axially aligned. Expanding the lower connector 500 may also angularly align the pin connector 514 (FIG. 6) of the lower connector 500 with the box connector 212 (FIG. 6) of the upper connector 200 as the pin connector 514 is moved into the recess 1214. Once the box and pin connectors 212, 514 are angularly aligned, the lower connector 500 may be rotated in order to mate the upper and lower connectors 200, 500, as described herein above. In some embodiments, the lower connector 500 may be rotated by rotating the wellbore tubing 110, such as from a surface location (not shown). In other embodiments, the expander cone 1220 may be configured to help facilitate rotation of the lower connector 500, as described above.

In the illustrated embodiment, the wellbore tubing 110 may be a gravel pack completion assembly that includes a circulating valve assembly (not shown) and one or more sand control screen assemblies (not shown), similar to the screen assemblies 116a-d of FIG. 1. In some embodiments, the casing 1206 may be extended into the wellbore 1208 and subsequently secured therein with cement 1210. In at least one embodiments, the casing 1206 may be a liner or the like cemented into the wellbore and "hung off" an upper casing (not shown), such as the casing 106 of FIG. 1. The bottom of the wellbore 1208 may then be drilled out or otherwise extended further downhole and the gravel pack completion assembly (i.e., the wellbore tubing 110) may subsequently be run into the wellbore 1208 and communicably connected to the casing 1206 and the casing nipple 1202. The wellbore isolation device 1112 may then be set in the casing 1206 while the screen assemblies 116a-d extend into open hole below the nipple profile 1212.

Once the upper and lower connectors 200, 500 are successfully mated, the lower control line 126 may be able to send/receive signals to/from a surface location via the upper control line 118. As a result, a subsequent gravel pack job, for instance, may be monitored (e.g., pump pressures) in real time with gauges and/or sensors to verify and otherwise track the placement of gravel across the screen assemblies 116a-d. The communication media mated at the upper and lower connectors 200, 500 may include one or more of optical fibers, electrical conductors, and hydraulic fluids or conduits. As a result, the electric and hydraulic connections may be used to power intelligent well completion devices associated with the gravel pack completion assembly, including the screen assemblies 116a-d, such as inflow control devices, valves, sensors, gauges, packers, etc.

In yet other embodiments, the casing nipple 1202 may be provided at an intermediate or lower intermediate location on the casing 1206. The casing 1206 may be perforated (not shown) below the casing nipple 1202 in order to provide fluid communication between a surrounding subterranean formation (e.g., the subterranean formation 104 of FIG. 1) and the interior of the wellbore tubing 110. Using the gravel pack completion assembly (i.e., the wellbore tubing 110), a gravel pack (not shown) may be placed across the perforations in the casing 1206 and pump pressures may be monitored at the surface from various gauges and/or sensors associated with the screen assemblies 116a-d. The connection at the casing control line connector 1200 may prove advantageous in providing power and communication to the lower completion. Other wellbore treatments or operations may equally be monitored using the principles of the present disclosure, such as fracking, acidizing, etc.

As will be appreciated, the casing control line connector 1200 may constitute a first casing control line connector in a series or plurality of casing control line connectors disposed within the wellbore 1208 at various axially offset and/or predetermined locations. For example, the wellbore tubing 110 may be a liner configured to be coupled to the interior of the casing 1206 and extend further downhole. While not shown, the wellbore tubing 110 may include a second casing control line connector at or near its distal end. The second casing control line connector (not shown) may be substantially similar to the first casing control line connector 1200 and, therefore, configured to couple upper and lower portions of a control line. More particularly, a second wellbore tubing (not shown) may be introduced into the wellbore 1208 and configured to mate with the wellbore tubing 110 at the second casing control line connector, and thereby communicably couple the lower control line 126 with a third control line (not shown) extending even further downhole along the exterior of the second wellbore tubing. Accordingly, the upper control line 118 may be able to be extended even further downhole by employing multiple wellbore tubings 110 that include corresponding matable casing control line connectors.

In accordance with such embodiments, a service tool (not shown) may be introduced into the wellbore 1208 and stung into the wellbore tubing 110 and communicably coupled thereto at the second control line connector. The service tool may include various inflow control devices, valves, sensors, gauges, and packers that may be powered and operated by communicably coupling to the wellbore tubing 110 at the second control line connector. As a result, various well treatments and/or operations, such as fracking, gravel packing, etc., may be undertaken by the service tool and such treatments/operations may be monitored in real-time at the surface. As will be appreciated, the service tool may span two or more production zones within the wellbore 1208, thereby providing real-time operating capabilities and monitoring over a large span of the wellbore 1208. Such embodiments may prove advantageous, for example, in deepwater applications. Following such well treatments/operations with the service tool, the service tool may be disconnected from the wellbore tubing 110, including disconnection of the second control line connector, and removed from the wellbore 1208. An intelligent completion assembly (not shown), including production tubing, may then be stung into the wellbore tubing 110 and communicably coupled thereto at the second control line connector. The intelligent completion may include various intelligent well completion devices, such as inflow control devices, valves, sensors, gauges, packers, etc. After successfully mating the intelligent completion assembly with the wellbore tubing 110 at the second control line connector, production operations may be regulated from the surface and monitored in real-time Referring now to FIGS. 13A and 13B, with continued reference to FIG. 12, illustrated are cross-sectional views of an exemplary multilateral wellbore system 1300 that may employ the principles of the present disclosure, according to one or more embodiments. The multilateral wellbore system 1300 of FIGS. 13A-13B may include a main or parent wellbore 1302 and a lateral wellbore 1304 extending and otherwise drilled from the main wellbore 1302. The main wellbore 1302 may be lined with casing 1306 secured within the main wellbore 1302 with cement 1308. A window 1310 may be defined or otherwise formed into the casing 1306 in order to accommodate the lateral wellbore 1304. The upper control line 118 is shown as extending along the outside of the casing 1306 and otherwise within the cement 1308.

A casing control line connector 1311 may be arranged within the main wellbore 1302 at a point uphole from the window 1310. In some embodiments, however, the casing control line connector 1311 may equally be arranged below the window 1310 within the main wellbore 1302 or the lateral wellbore 1304, without departing from the scope of the disclosure. The casing control line connector 1311 may be substantially similar to the casing control line connector 1200 of FIG. 12 and may be best understood with reference thereto. For instance, the casing control line connector 1311 may include a casing nipple 1312 and a connector assembly 1314 substantially similar to the casing nipple 1202 and the connector assembly 1204 of FIG. 12. While not shown, the casing nipple 1312 may include a selective nipple profile configured to mate with a corresponding selective anchor profile (not shown) associated with the connector assembly 1314. The upper connector 200 may be coupled or otherwise attached to the casing nipple 1312 and the lower connector 500 may be coupled or otherwise attached to the connector assembly 1314. Moreover, an expander cone 1316 similar to the expander cone 1220 of FIG. 12 may be included in the connector assembly 1314 and configured to expand the lower connector 500 so that it may mate with the upper connector 200, as generally described above.

Figure 13A:
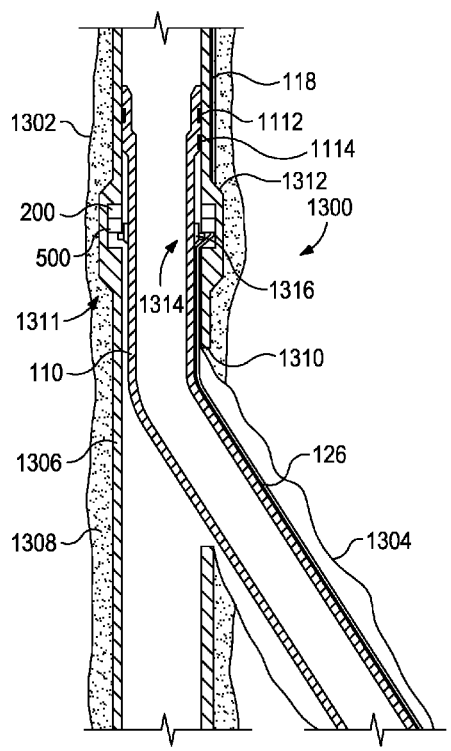
FIGS. 13A and 13B illustrate cross-sectional views of a multilateral wellbore system that may employ the principles of the present disclosure, according to one or more embodiments.

In FIG. 13A, the wellbore tubing 110 may be a liner or a casing extension, and the connector assembly 1314 may be arranged thereon. The connector assembly 1314 may be attached below a wellbore isolation device 1112; e.g., a liner hanger or packer, arranged on the wellbore tubing 110 and at least one sonic tool 1114, as described above in FIG. 12. The distal end of the wellbore tubing 110 may be extended into the lateral wellbore 1304. In some embodiments, the lateral wellbore 1304 may be cemented and thereby secure the wellbore tubing 110 therein. In other embodiments, however, a swell packer (not shown) or the like may be deployed within the lateral wellbore 1304 to secure the wellbore tubing 110 therein. Upon successfully mating the upper and lower connectors 200, 500, the upper and lower control lines 118, 126 may be communicably coupled. As a result, signals may be sent/received to/from a surface location within the lateral wellbore 1304 so that any wellbore operations undertaken in the lateral wellbore 1304 may be monitored or controlled from the surface location. The wellbore system 1300 depicted in FIG. 13A may be a permanent completion that extends through the lateral wellbore 1304. Once the wellbore tubing 110 is run into the lateral wellbore 1304 and the liner hanger (i.e., the wellbore isolation device 1112) is set, the wellbore tubing 110 may be irretrievable and otherwise permanently placed downhole.

Figure 13B:
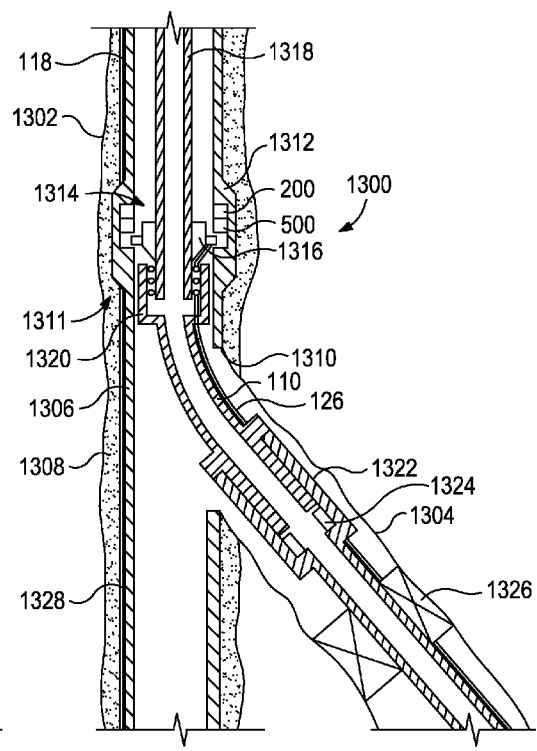

In FIG. 13B, the wellbore tubing 110 may be a liner or tubing coupled to a production string 1318 extended into the main wellbore 1302 from a surface location. The wellbore tubing 110 may be extended into the lateral wellbore 1304 and may include a travel joint 1320 and an electro-hydraulic completion receptacle 1322 disposed thereon. The lower control line 126 may extend downhole from the travel joint 1320 and communicate with the completion receptacle 1322. More particularly, the lower control line 126 may be configured to provide the completion receptacle 1322 with one or more electrical conductors and/or one or more hydraulic conduits used to power and otherwise control the completion receptacle 1322. A wet mate fiber optic connector 1324 may be associated with the completion receptacle 1322 and the lower control line 126 may extend downhole therefrom along the exterior of the wellbore tubing 110. In some embodiments, the wet mate connector 1324 may be made up while assembling the wellbore tubing on the surface. In other embodiments, the wet mate connector 1324 may be made up downhole similar to the upper and lower connectors described herein.

In some embodiments, the wellbore tubing 110 may be secured within the lateral wellbore 1304 by deploying a swell packer 1326 therein. The lower control line may be configured to extend through the swell packer 1326 further downhole. Upon successfully mating the upper and lower connectors 200, 500 at the casing control line connector 1311, the upper and lower control lines 118, 126 may be communicably coupled and, as a result, a well operator may be able to monitor and/or control wellbore operations undertaken in the lateral wellbore 1304. Moreover, in one or more embodiments, a lower portion 1328 of the upper control line 118 may extend downhole past the casing control line connector 1311 within the main wellbore 1302 and otherwise outside of the casing 1306 and within the cement 1308. As a result, the well operator may further be able to monitor and/or control wellbore operations undertaken in the main wellbore 1302 below the window 1310.

The wellbore system 1300 of FIG. 13B may be a type of retrievable completion. More particularly, the completion receptacle 1322 and the swell packer 1326 may be part of a completion assembly, such as a gravel pack completion or a stand-alone screen completion assembly, that has been extended into the lateral wellbore 1304. The casing control line connector 1311 and the travel joint 1320 may be used to communicably couple the wellbore tubing 110 to the upper control line 118 such that downhole communication along the lower control line 126 is facilitated into the lateral wellbore 1304.

Embodiments disclosed herein include:

A. A control line connector that includes an expandable housing having a helical body that defines one or more windings and a helical shroud disposed about the one or more windings, wherein a helical conduit chamber is defined between the helical body and the helical shroud, a matable connector at least partially disposed within the expandable housing and providing a mating face that faces tangentially with respect to an adjacent portion of the expandable housing so as to angularly mate with an opposing matable connector, and a splitter block coupled to the expandable housing and conveying one or more communication media into the helical conduit chamber to communicate with the matable connector.

B. A control line connector assembly that includes an upper control line connector having an upper housing and a first matable connector, the first matable connector providing a first angular mating face that faces tangentially with respect to the upper housing, a lower control line connector configured to mate with the upper control line connector and having an expandable lower housing and a second matable connector, the expandable lower housing having a helical body that defines one or more windings and a helical shroud disposed about the one or more windings, and the second matable connector providing a second angular mating face that faces tangentially with respect to the expandable lower housing, an upper control line operatively coupled to the upper housing and providing one or more first communication media that extend through the upper housing to the first matable connector, and a lower control line operatively coupled to the expandable lower housing and providing one or more second communication media that extend through the expandable lower housing to the second matable connector, wherein the one or more first communication media is communicably coupled to the one or more second communication media by angularly rotating one or both of the upper and lower control line connectors with respect to each other to engage the first angular mating face against the second angular mating face and subsequently mate the first matable connector to the second matable connector.

C. A method of coupling a control line that includes axially aligning an upper control line connector with a lower control line connector, the upper control line connector having an upper housing and a first matable connector, and the lower control line connector having an expandable lower housing and a second matable connector, radially expanding the expandable lower housing and thereby angularly aligning the second matable connector with the first matable connector, the expandable lower housing having a helical body that defines one or more windings and a helical shroud disposed about the one or more windings, angularly rotating one or both of the upper and lower control line connectors with respect to each other and thereby engaging a first angular mating face of the first matable connector with a second angular mating face of the second matable connector, wherein the first angular mating face faces tangentially with respect to the upper housing and the second angular mating face faces tangentially with respect to the expandable lower housing, mating the first matable connector to the second matable connector by further angularly rotating one or both of the upper and lower control line connectors with respect to each other, and communicably coupling one or more first communication media in the first matable connector with one or more second communication media in the second matable connector, wherein the one or more first communication media extends within the upper housing and to the first matable connector from a first control line operatively coupled to the upper housing, and wherein the one or more second communication media extends within the expandable lower housing and to the second matable connector from a second control line operatively coupled to the expandable lower housing.

Each of embodiments A, B, and C may have one or more of the following additional elements in any combination: Element 1: wherein the one or more communication media are communication media selected from the group consisting of optical fibers, electrical conductors, and hydraulic fluid. Element 2: one or more tubular conduits arranged within the helical conduit chamber and extending from the splitter block to the matable connector, the one or more tubular conduits providing a corresponding passageway for each of the one or more communication media to communicate with the matable connector. Element 3: wherein the splitter block further comprises a control line port configured to receive and seat a control line, one or more tubular conduit ports configured to receive and seat the one or more tubular conduits, and one or more communication media pathways extending between the control line port and the one or more tubular conduit ports, each communication media pathway being configured to receive and convey a separate communication medium from the control line port to the one or more tubular conduits. Element 4: wherein the separate communication medium in at least one of the one or more communication media pathways is an optical fiber, and wherein the splitter block further comprises a pressure seal made on the optical fiber at or near a corresponding one of the one or more tubular conduit ports. Element 5: wherein the matable connector is a box connector comprising one or more holes defined in the mating face, one or more needle guides defined within the box connector and extending from the one or more holes, and one or more alignment features defined within the box connector and extending from the one or more needle guides. Element 6: wherein the box mating face is sealed to prevent an influx of debris into the one or more holes with at least one of a lid and plugs disposed within the one or more holes. Element 7: wherein the matable connector is a pin connector comprising one or more hypodermic tubes extending from the pin connector, and a retractable cover having the mating face defined on an end thereof and being movable between an extended configuration, where the one or more hypodermic tubes are arranged within the retractable cover, and a retracted configuration, where the one or more hypodermic tubes penetrate the mating face. Element 8: wherein the one or more windings comprise a single winding that extends only a fraction of a single revolution.

Element 9: wherein the one or more first and second communication media are communication media selected from the group consisting of optical fibers, electrical conductors, and hydraulic fluid. Element 10: further comprising a first splitter block coupled to the upper housing and configured to operatively couple the upper control line to the upper housing and convey the one or more first communication media into the upper housing, and a second splitter block coupled to the expandable lower housing and configured to operatively couple the lower control line to the expandable lower housing and convey the one or more second communication media into the expandable lower housing. Element 11: further comprising a conduit chamber defined within the upper housing between an upper housing body and an upper housing shroud, a helical conduit chamber defined within the expandable lower housing between the helical body and a helical shroud that extends about the helical body, one or more first tubular conduits arranged within the conduit chamber and extending from the first splitter block to the first matable connector, the one or more first tubular conduits providing corresponding passageways for the one or more first communication media to communicate with the first matable connector, and one or more second tubular conduits arranged within the helical conduit chamber and extending from the second splitter block to the second matable connector, the one or more second tubular conduits providing corresponding passageways for the one or more second communication media to communicate with the second matable connector. Element 12: further comprising optical gel disposed within the conduit chamber, a gel inlet defined in at least one of the one or more first tubular conduits that allows the optical gel to flow into the at least one of the one or more first tubular conduits and to the first matable connector, and a gel reservoir fluidly coupled to the conduit chamber and configured to supply additional optical gel into the conduit chamber. Element 13: wherein the upper housing further defines a first axial mating face and the expandable lower housing further defines a second axial mating face, and wherein the first axial mating face engages the second axial mating face upon mating the upper and lower control line connectors. Element 14: wherein the first and second axial mating faces are complementarily angled. Element 15: wherein the first matable connector is a box connector and the second matable connector is a pin connector, the assembly further comprising one or more holes defined in the first angular mating face of the box connector, a retractable cover arranged on the pin connector, the second angular mating face being defined on an end of the retractable cover, and one or more hypodermic tubes extending from the pin connector and configured to extend into the one or more holes when the pin connector mates with the box connector, wherein the retractable cover is movable between an extended configuration, where the one or more hypodermic tubes are arranged within the retractable cover, and a retracted configuration, where the second angular mating face engages the first angular mating face and the one or more hypodermic tubes penetrate the second angular mating face and extend into the one or more holes. Element 16: wherein the first angular mating face is sealed to prevent an influx of debris into the one or more holes. Element 17: further comprising one or more needle guides defined within the box connector and extending from the one or more holes, and one or more alignment features defined within the box connector and extending from the one or more needle guides, wherein the one or more needle guides align the one or more hypodermic tubes with the one or more alignment features, and wherein each alignment feature is configured to align a corresponding one of the one or more first communication media extending from the pin connector with a corresponding one of the one or more second communication media extending within the box connector.

Element 18: wherein radially expanding the expandable lower housing comprises engaging a first axial mating face defined on the upper housing with a second axial mating face defined on the expandable lower housing. Element 19: wherein the first and second axial mating faces are complementarily angled, the method further comprising slidingly engaging the first and second axial mating faces as one or both of the upper and lower control line connectors is angularly rotated with respect to each other. Element 20: wherein the first angular mating face has one or more holes defined therein and the second matable connector includes a retractable cover having the second angular mating face defined thereon, and wherein mating the first matable connector to the second matable connector further comprises angularly engaging the second angular mating face on the first angular mating face with the retractable cover in an extended configuration, wherein one or more hypodermic tubes extend from the first matable connector within the retractable cover, penetrating the second angular mating face with the one or more hypodermic tubes as the retractable cover is moved toward a retracted configuration, and extending the one or more hypodermic tubes into the one or more holes as the retractable cover is moved toward the retracted configuration. Element 21: wherein extending the one or more hypodermic tubes into the one or more holes further comprises penetrating a sealed interface on the first angular mating face that prevents an influx of debris into the one or more holes. Element 22: wherein extending the one or more hypodermic tubes into the one or more holes further comprises extending the one or more hypodermic tubes into one or more needle guides defined within the first matable connector, aligning the one or more hypodermic tubes with a corresponding one or more alignment features defined within the first matable connector, and aligning within each alignment feature one of the one or more second communication media extending from the second matable connector with one of the one or more first communication media extending within the first matable connector. Element 23: wherein a first conduit chamber is defined within the upper housing between an upper body and an upper body shroud that extends about the upper body, and a helical conduit chamber is defined within the expandable lower housing between the helical body and the helical shroud, the method further comprising conveying the one or more first communication media into the upper housing from the upper control line via a first splitter block, conveying the one or more first communication media to the first matable connector from the first splitter block via one or more first tubular conduits arranged within the conduit chamber, conveying the one or more second communication media into the lower housing from the lower control line via a second splitter block, and conveying the one or more second communication media to the second matable connector from the second splitter block via one or more second tubular conduits arranged within the helical conduit chamber. Element 24: wherein an optical gel is disposed within the first conduit chamber and a gel inlet is defined in at least one of the one or more first tubular conduits, and wherein mating the first matable connector to the second matable connector further comprises moving the first matable connector into the upper housing and to a retracted configuration, and thereby resulting in a fluid pressure increase within the first conduit chamber, and flowing a portion of the optical gel into the at least one of the one or more first tubular conduits via the gel inlet in response to the fluid pressure increase. Element 25: wherein a gel reservoir is fluidly coupled to the first conduit chamber, the method further comprising moving the first matable connector to an extended configuration within the upper housing upon disconnecting the first matable connector from the second matable connector, and thereby generating a pressure differential within the first conduit chamber, and alleviating the pressure differential within the first conduit chamber by supplying additional optical gel into the first conduit chamber with the gel reservoir.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A control line connector, comprising:
   an expandable housing having a helical body that defines one or more windings and a helical shroud disposed about the one or more windings, wherein a helical conduit chamber is defined between the helical body and the helical shroud;
   a matable connector at least partially disposed within the expandable housing and providing a mating face that faces tangentially with respect to an adjacent portion of the expandable housing so as to angularly mate with an opposing matable connector; and
   a splitter block coupled to the expandable housing and conveying one or more communication media into the helical conduit chamber to communicate with the matable connector.

2. The control line connector of claim 1, wherein the one or more communication media are communication media selected from the group consisting of optical fibers, electrical conductors, and hydraulic fluid.

3. The control line connector of claim 1, one or more tubular conduits arranged within the helical conduit chamber and extending from the splitter block to the matable connector, the one or more tubular conduits providing a corresponding passageway for each of the one or more communication media to communicate with the matable connector.

4. The control line connector of claim 3, wherein the splitter block further comprises:
   a control line port configured to receive and seat a control line;
   one or more tubular conduit ports configured to receive and seat the one or more tubular conduits; and
   one or more communication media pathways extending between the control line port and the one or more tubular conduit ports, each communication media pathway being configured to receive and convey a separate communication medium from the control line port to the one or more tubular conduits.

5. The control line connector of claim 4, wherein the separate communication medium in at least one of the one or more communication media pathways is an optical fiber, and wherein the splitter block further comprises a pressure seal made on the optical fiber at or near a corresponding one of the one or more tubular conduit ports.

6. The control line connector of claim 1, wherein the matable connector is a box connector comprising:
   one or more holes defined in the mating face;
   one or more needle guides defined within the box connector and extending from the one or more holes; and
   one or more alignment features defined within the box connector and extending from the one or more needle guides.

7. The control line connector of claim 6, wherein the mating face of the box connector is sealed to prevent an influx of debris into the one or more holes with at least one of a lid and plugs disposed within the one or more holes.

8. The control line connector of claim 1, wherein the matable connector is a pin connector comprising:
one or more hypodermic tubes extending from the pin connector; and
a retractable cover having the mating face defined on an end thereof and being movable between an extended configuration, where the one or more hypodermic tubes are arranged within the retractable cover, and a retracted configuration, where the one or more hypodermic tubes penetrate the mating face.

9. The control line connector of claim 1, wherein the one or more windings comprise a single winding that extends only a fraction of a single revolution.

10. A control line connector assembly, comprising:
an upper control line connector having an upper housing and a first matable connector, the first matable connector providing a first angular mating face that faces tangentially with respect to the upper housing;
a lower control line connector configured to mate with the upper control line connector and having an expandable lower housing and a second matable connector, the expandable lower housing having a helical body that defines one or more windings and a helical shroud disposed about the one or more windings, and the second matable connector providing a second angular mating face that faces tangentially with respect to the expandable lower housing;
an upper control line operatively coupled to the upper housing and providing one or more first communication media that extend through the upper housing to the first matable connector; and
a lower control line operatively coupled to the expandable lower housing and providing one or more second communication media that extend through the expandable lower housing to the second matable connector,
wherein the one or more first communication media is communicably coupled to the one or more second communication media by angularly rotating one or both of the upper and lower control line connectors with respect to each other to engage the first angular mating face against the second angular mating face and subsequently mate the first matable connector to the second matable connector.

11. The assembly of claim 10, wherein the one or more first and second communication media are communication media selected from the group consisting of optical fibers, electrical conductors, and hydraulic fluid.

12. The assembly of claim 10, further comprising:
a first splitter block coupled to the upper housing and configured to operatively couple the upper control line to the upper housing and convey the one or more first communication media into the upper housing; and
a second splitter block coupled to the expandable lower housing and configured to operatively couple the lower control line to the expandable lower housing and convey the one or more second communication media into the expandable lower housing.

13. The assembly of claim 12, further comprising:
a conduit chamber defined within the upper housing between an upper housing body and an upper housing shroud;
a helical conduit chamber defined within the expandable lower housing between the helical body and a helical shroud that extends about the helical body;
one or more first tubular conduits arranged within the conduit chamber and extending from the first splitter block to the first matable connector, the one or more first tubular conduits providing corresponding passageways for the one or more first communication media to communicate with the first matable connector; and
one or more second tubular conduits arranged within the helical conduit chamber and extending from the second splitter block to the second matable connector, the one or more second tubular conduits providing corresponding passageways for the one or more second communication media to communicate with the second matable connector.

14. The assembly of claim 13, further comprising:
optical gel disposed within the conduit chamber;
a gel inlet defined in at least one of the one or more first tubular conduits that allows the optical gel to flow into the at least one of the one or more first tubular conduits and to the first matable connector; and
a gel reservoir fluidly coupled to the conduit chamber and configured to supply additional optical gel into the conduit chamber.

15. The assembly of claim 10, wherein the upper housing further defines a first axial mating face and the expandable lower housing further defines a second axial mating face, and wherein the first axial mating face engages the second axial mating face upon mating the upper and lower control line connectors.

16. The assembly of claim 15, wherein the first and second axial mating faces are complementarily angled.

17. The assembly of claim 10, wherein the first matable connector is a box connector and the second matable connector is a pin connector, the assembly further comprising:
one or more holes defined in the first angular mating face of the box connector;
a retractable cover arranged on the pin connector, the second angular mating face being defined on an end of the retractable cover; and
one or more hypodermic tubes extending from the pin connector and configured to extend into the one or more holes when the pin connector mates with the box connector,
wherein the retractable cover is movable between an extended configuration, where the one or more hypodermic tubes are arranged within the retractable cover, and a retracted configuration, where the second angular mating face engages the first angular mating face and the one or more hypodermic tubes penetrate the second angular mating face and extend into the one or more holes.

18. The assembly of claim 17, wherein the first angular mating face is sealed to prevent an influx of debris into the one or more holes.

19. The assembly of claim 17, further comprising:
one or more needle guides defined within the box connector and extending from the one or more holes; and
one or more alignment features defined within the box connector and extending from the one or more needle guides,
wherein the one or more needle guides align the one or more hypodermic tubes with the one or more alignment features, and
wherein each alignment feature is configured to align a corresponding one of the one or more first communication media extending from the pin connector with a corresponding one of the one or more second communication media extending within the box connector.

20. A method of coupling a control line, comprising:
axially aligning an upper control line connector with a lower control line connector, the upper control line connector having an upper housing and a first matable connector, and the lower control line connector having a radially expandable lower housing and a second matable connector;

radially expanding the expandable lower housing and thereby angularly aligning the second matable connector with the first matable connector, the expandable lower housing having a helical body that defines one or more windings and a helical shroud disposed about the one or more windings;

angularly rotating one or both of the upper and lower control line connectors with respect to each other and thereby engaging a first angular mating face of the first matable connector with a second angular mating face of the second matable connector, wherein the first angular mating face faces tangentially with respect to the upper housing and the second angular mating face faces tangentially with respect to the expandable lower housing;

mating the first matable connector to the second matable connector by further angularly rotating one or both of the upper and lower control line connectors with respect to each other; and communicably coupling one or more first communication media in the first matable connector with one or more second communication media in the second matable connector, wherein the one or more first communication media extends within the upper housing and to the first matable connector from a first control line operatively coupled to the upper housing, and wherein the one or more second communication media extends within the expandable lower housing and to the second matable connector from a second control line operatively coupled to the expandable lower housing.

21. The method of claim 20, wherein radially expanding the expandable lower housing comprises engaging a first axial mating face defined on the upper housing with a second axial mating face defined on the expandable lower housing.

22. The method of claim 21, wherein the first and second axial mating faces are complementarily angled, the method further comprising slidingly engaging the first and second axial mating faces as one or both of the upper and lower control line connectors is angularly rotated with respect to each other.

23. The method of claim 20, wherein the first angular mating face has one or more holes defined therein and the second matable connector includes a retractable cover having the second angular mating face defined thereon, and wherein mating the first matable connector to the second matable connector further comprises:

angularly engaging the second angular mating face on the first angular mating face with the retractable cover in an extended configuration, wherein one or more hypodermic tubes extend from the first matable connector within the retractable cover;

penetrating the second angular mating face with the one or more hypodermic tubes as the retractable cover is moved toward a retracted configuration; and extending the one or more hypodermic tubes into the one or more holes as the retractable cover is moved toward the retracted configuration.

24. The method of claim 23, wherein extending the one or more hypodermic tubes into the one or more holes further comprises penetrating a sealed interface on the first angular mating face that prevents an influx of debris into the one or more holes.

25. The method of claim 23, wherein extending the one or more hypodermic tubes into the one or more holes further comprises:

extending the one or more hypodermic tubes into one or more needle guides defined within the first matable connector;

aligning the one or more hypodermic tubes with a corresponding one or more alignment features defined within the first matable connector; and aligning within each alignment feature one of the one or more second communication media extending from the second matable connector with one of the one or more first communication media extending within the first matable connector.

26. The method of claim 20, wherein a first conduit chamber is defined within the upper housing between an upper body and an upper body shroud that extends about the upper body, and a helical conduit chamber is defined within the expandable lower housing between the helical body and the helical shroud, the method further comprising:

conveying the one or more first communication media into the upper housing from an upper control line via a first splitter block;

conveying the one or more first communication media to the first matable connector from the first splitter block via one or more first tubular conduits arranged within the first conduit chamber;

conveying the one or more second communication media into the lower housing from a lower control line via a second splitter block; and conveying the one or more second communication media to the second matable connector from the second splitter block via one or more second tubular conduits arranged within the helical conduit chamber.

27. The method of claim 26, wherein an optical gel is disposed within the first conduit chamber and a gel inlet is defined in at least one of the one or more first tubular conduits, and wherein mating the first matable connector to the second matable connector further comprises:

moving the first matable connector into the upper housing and to a retracted configuration, and thereby resulting in a fluid pressure increase within the first conduit chamber; and flowing a portion of the optical gel into the at least one of the one or more first tubular conduits via the gel inlet in response to the fluid pressure increase.

28. The method of claim 27, wherein a gel reservoir is fluidly coupled to the first conduit chamber, the method further comprising:

moving the first matable connector to an extended configuration within the upper housing upon disconnecting the first matable connector from the second matable connector, and thereby generating a pressure differential within the first conduit chamber; and alleviating the pressure differential within the first conduit chamber by supplying additional optical gel into the first conduit chamber with the gel reservoir.

* * * * *